(12) United States Patent
Jadhav et al.

(10) Patent No.: US 11,859,123 B2
(45) Date of Patent: Jan. 2, 2024

(54) WELLBORE SERVICING FLUID AND METHODS OF MAKING AND USING SAME

(71) Applicant: Halliburton Energy Services, Inc., Houston, TX (US)

(72) Inventors: Rahul Jadhav, Stavanger (NO); Gunnar Lende, Stavanger (NO); Samuel J. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 17/964,604

(22) Filed: Oct. 12, 2022

(65) Prior Publication Data

US 2023/0031506 A1 Feb. 2, 2023

Related U.S. Application Data

(63) Continuation of application No. 17/188,524, filed on Mar. 1, 2021, now abandoned.
(Continued)

(51) Int. Cl.
*C09K 8/48* (2006.01)
*C09K 8/473* (2006.01)
(Continued)

(52) U.S. Cl.
CPC ............... *C09K 8/48* (2013.01); *C04B 14/06* (2013.01); *C04B 14/104* (2013.01); *C04B 24/38* (2013.01);
(Continued)

(58) Field of Classification Search
CPC .. C09K 8/48; C09K 8/40; C09K 8/473; C04B 14/06; C04B 14/104; C04B 24/38;
(Continued)

(56) References Cited

U.S. PATENT DOCUMENTS 6,451,743 B1 9/2002 Fox
6,620,769 B1 9/2003 Juppe et al.
(Continued)

FOREIGN PATENT DOCUMENTS

EP 0104795 A2 4/1984
EP 1348832 A1 10/2003
(Continued)

OTHER PUBLICATIONS

Filing Receipt, Specification and Drawings for U.S. Appl. No. 63/188,700, entitled "Wellbore Servicing Fluid and Methods of Making and Using Same," filed May 14, 2021, 63 pages.
(Continued)

*Primary Examiner* — Crystal J. Lee
(74) *Attorney, Agent, or Firm* — Conley Rose, P.C.; Rodney B. Carroll

(57) ABSTRACT

A method comprising (a) contacting a suspension composition, water, and optionally one or more additives to form a wellbore servicing fluid at a location proximate a wellsite; wherein the suspension composition comprises a particulate material, an organic carrier fluid, and a suspension viscosifier; and (b) placing the wellbore servicing fluid in a wellbore penetrating a subterranean formation. The wellsite comprises an offshore platform, a floating vessel, or combinations thereof; and wherein the wellbore is offshore. A suspension composition comprising a particulate material, an organic carrier fluid, and a suspension viscosifier; wherein the particulate material is substantially insoluble in the organic carrier fluid; wherein the particulate material comprises a water-interactive material and/or a water-insoluble material; and wherein the organic carrier fluid comprises a glycol and/or a glycol ether.

20 Claims, 6 Drawing Sheets

Related U.S. Application Data

(60) Provisional application No. 63/025,702, filed on May 15, 2020.

(51) Int. Cl.
*C09K 8/40* (2006.01)
*C04B 28/02* (2006.01)
*C04B 14/06* (2006.01)
*C04B 14/10* (2006.01)
*E21B 33/14* (2006.01)
*C04B 24/38* (2006.01)
*C04B 103/44* (2006.01)
*C04B 103/00* (2006.01)

(52) U.S. Cl.
CPC ............... *C04B 28/02* (2013.01); *C09K 8/40* (2013.01); *C09K 8/473* (2013.01); *E21B 33/14* (2013.01); *C04B 2103/0093* (2013.01); *C04B 2103/44* (2013.01)

(58) Field of Classification Search
CPC ............ C04B 28/02; C04B 2103/0093; C04B 2103/44; E21B 33/14
See application file for complete search history.

(56) References Cited

U.S. PATENT DOCUMENTS

| | | | |
|---|---|---|---|
| 6,668,929 | B2 | 12/2003 | Griffith et al. |
| 6,743,756 | B2 | 6/2004 | Harris, Jr. |
| 7,740,070 | B2 | 6/2010 | Santra et al. |
| 7,790,774 | B1 | 9/2010 | Kinsey, III et al. |
| 9,120,918 | B2 | 9/2015 | Soddemann et al. |
| 2003/0181532 | A1* | 9/2003 | Parris ............... C09K 8/58 516/20 |
| 2008/0017376 | A1 | 1/2008 | Badalamenti et al. |
| 2012/0152540 | A1 | 6/2012 | Patil et al. |
| 2014/0090843 | A1 | 4/2014 | Boul et al. |
| 2014/0166285 | A1* | 6/2014 | Santra ............... C09K 8/424 166/292 |
| 2014/0318786 | A1 | 10/2014 | Vidma et al. |
| 2014/0326452 | A1 | 11/2014 | Loiseau et al. |
| 2015/0072902 | A1 | 3/2015 | Lafitte et al. |
| 2016/0160109 | A1 | 6/2016 | Patil et al. |
| 2016/0264838 | A1 | 9/2016 | Nelson |
| 2016/0264842 | A1 | 9/2016 | Miller et al. |
| 2017/0130115 | A1 | 5/2017 | Ballard |
| 2021/0355366 | A1 | 11/2021 | Jadhav et al. |
| 2022/0363972 | A1 | 11/2022 | Jones et al. |

FOREIGN PATENT DOCUMENTS

| | | |
|---|---|---|
| EP | 3814448 A1 | 5/2021 |
| WO | 2007074330 A1 | 7/2007 |
| WO | 2007132212 A2 | 11/2007 |
| WO | 2014167375 A1 | 10/2014 |
| WO | 2016154363 A1 | 9/2016 |
| WO | 2020209831 A1 | 10/2020 |
| WO | 2021230954 A1 | 11/2021 |
| WO | 2022240458 A1 | 11/2022 |

OTHER PUBLICATIONS

Filing Receipt, Specification and Drawings for U.S. Appl. No. 63/025,702, entitled "Wellbore Servicing Fluid and Methods of Making and Using Same," filed May 15, 2020, 53 pages.

Foreign Communication from Related Application—International Search Report and Written Opinion of the International Searching Authority, International Application No. PCT/US2022/015171, dated May 24, 2022, 10 pages.

Thwala, Justice M. et al., "Rheological Studies of Stability of Colloidal Silica Particles Dispersed in Monoethylene Glycol (MEG) Stabilized by Dodecyl Hexa Ethylene Glycol Monoether (C12E6)," Langmuir, Jul. 23, 2009, vol. 25, No. 22, pp. 12926-12936, American Chemical Society.

Electronic Acknowledgment Receipt, Specification and Drawings for International Application No. PCT/US2021/020507, entitled "A Wellbore Servicing Fluid and Methods of Making and Using Same," filed Mar. 2, 2021, 70 pages.

Foreign Communication from Related Application—International Search Report and Written Opinion of the International Searching Authority, International Application No. PCT/US2021/020507, dated Jun. 21, 2021, 11 pages.

Office Action dated Jan. 21, 2022 (21 pages), U.S. Appl. No. 17/188,524, filed Mar. 1, 2021.

Final Office Action dated Jun. 13, 2022 (22 pages), U.S. Appl. No. 17/188,524, filed Mar. 1, 2021.

Foreign Communication from Related Application—International Search Report and Written Opinion of the International Searching Authority, International Application No. PCT/US2019/026362, dated Jan. 6, 2020, 11 pages.

* cited by examiner

After 28 days Suspension Composition is pourable

WELLBORE SERVICING FLUID AND METHODS OF MAKING AND USING SAME

CROSS-REFERENCE TO RELATED APPLICATIONS

This application is a Continuation of and claims priority to U.S. patent application Ser. No. 17/188,524 filed Mar. 1, 2021, which claims priority to U.S. Provisional Patent Application No. 63/025,702 filed on May 15, 2020, both entitled "Wellbore Servicing Fluid and Methods of Making and Using Same." the disclosures of which are hereby incorporated herein by reference in their entirety.

BACKGROUND

This disclosure relates to compositions and methods of servicing a wellbore. More specifically, it relates to wellbore servicing fluid compositions and methods of using same during servicing a wellbore penetrating a subterranean formation.

Natural resources such as gas, oil, and water residing in a subterranean formation or zone are usually recovered by drilling a wellbore down to the subterranean formation while circulating a drilling fluid in the wellbore. The drilling fluid is usually circulated downward through an interior of a drill pipe and upward through an annulus, which is located between the exterior of the drill pipe and the interior wall of the wellbore. After terminating the circulation of the drilling fluid, a string of pipe, e.g., casing, is run in the wellbore. Next, a train of fluids, including a spacer or an efficiency fluid, can be placed though the interior of the pipe and upward into the annulus to displace a portion of the existing fluid in the annulus, in order to separate the drilling fluid from the cementing fluid and prepare the wellbore to receive the cementing fluid. After that, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

Offshore oil and gas production is usually more challenging than land-based onshore oil and gas production due to remote and harsher environment. Offshore drilling, completion, workover, and production operations are typically conducted from a drilling rig located on an offshore platform that is bottom-founded or floating. A bottom-founded platform extends from the seafloor upwardly to a deck located above the surface of the water, and at least a portion of the weight of the platform is supported by the seafloor. A floating platform is a ship, vessel, or another structure such as a tension-leg platform, in which the weight of the platform is supported by water buoyancy. Both of the two types of the offshore platforms may have constraints for equipment/tools due to offshore conditions (e.g., limited space, motion) and may need special equipment/tools, compared to an onshore wellbore. In addition, offshore drilling, completion, workover, and production operations present more environmental challenges than those operations onshore, from the produced hydrocarbons and the materials used during the operations.

Thus, an ongoing need exists for a wellbore servicing fluid and methods of making and using same at a location having limited equipment/tools/space (e.g., an offshore platform), while reducing environmental impacts.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
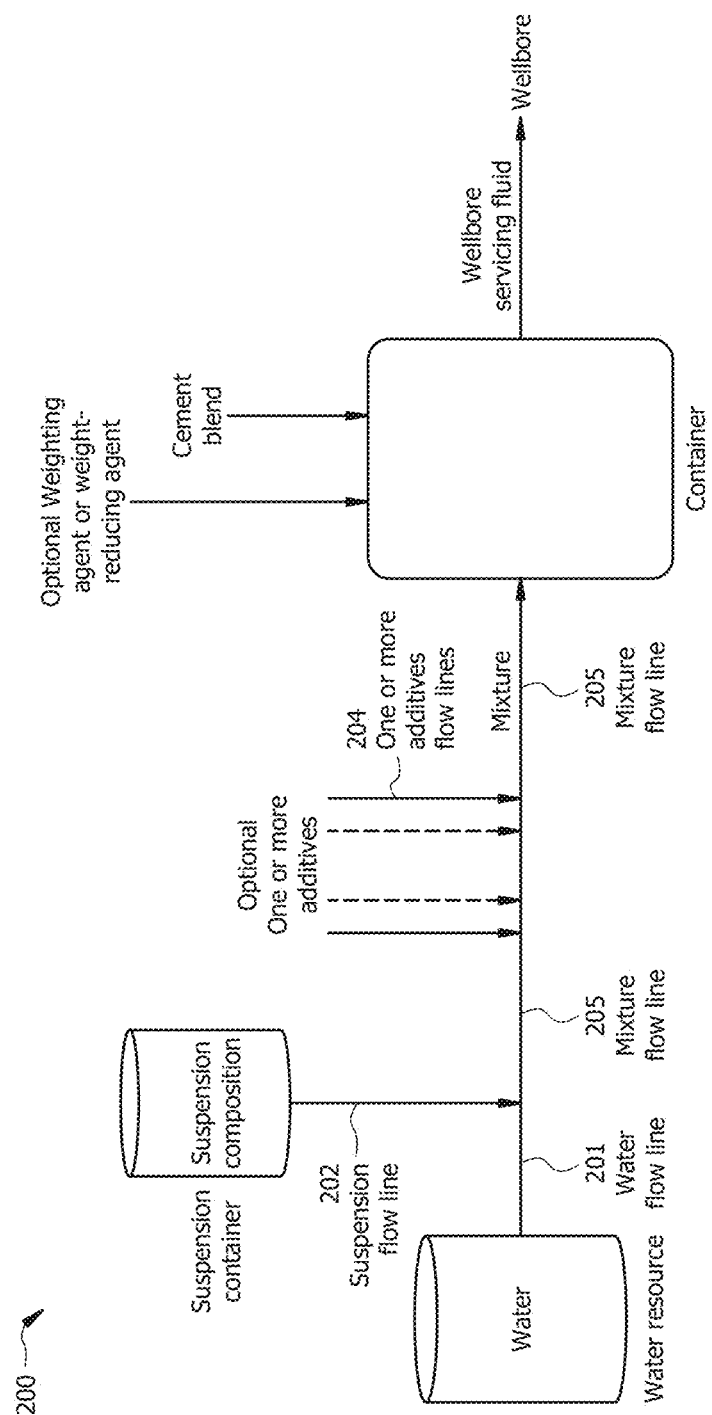
FIG. 1 is a process flow diagram according to some embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. It is to be understood that "subterranean formation" encompasses both areas below exposed earth and areas below earth covered by water such as ocean or fresh water.

Disclosed herein are methods and compositions for making and using a wellbore servicing fluid, more specifically, a wellbore servicing fluid comprising a suspension composition. In some embodiments, a wellbore servicing fluid of the type disclosed herein can be a cementitious fluid or cement slurry, and can be used for cementing a wellbore penetrating a subterranean formation. In other embodiments, a wellbore servicing fluid of the type disclosed herein can be a spacer fluid, and can be used for separating a drilling fluid from a cementitious fluid.

Disclosed herein are methods of preparing a suspension composition, methods of preparing a wellbore servicing fluid comprising the suspension composition, and methods of servicing a wellbore (e.g., cementing; using a spacer fluid) by placing the wellbore servicing fluid comprising the suspension composition into the wellbore.

In some embodiments, the wellbore servicing fluid can be a cementitious fluid, wherein the cementitious fluid comprises the suspension composition, water, and a cement blend. In other embodiments, the wellbore servicing fluid can be a spacer fluid, wherein the spacer fluid comprises the suspension composition and water. The spacer fluid may be used to separate the cementitious fluid from another fluid, such as a drilling fluid, as will be described on more detail later herein.

In embodiments, the suspension composition can comprise a particulate material, an organic carrier fluid, and a suspension viscosifier; alternatively a particulate material, an organic carrier fluid, a suspension viscosifier and a biocide; or alternatively a particulate material, an organic carrier fluid, a suspension viscosifier, water and a biocide. In embodiments, the suspension composition is a substantially homogenous mixture (e.g., a suspension) in which the particulate material does not dissolve, but gets uniformly suspended throughout the bulk of an organic carrier fluid. For example, the particulate material is uniformly dispersed (e.g., floating around freely) in the suspension composition. A discontinuous internal phase (e.g., particulate material) of the suspension composition can be uniformly dispersed throughout a continuous external phase (e.g., organic carrier fluid) of the homogenous suspension composition through preparation (e.g., mixing or blending), with the use of a viscosifying suspending agent (e.g., the suspension viscosifier). The suspension composition may be prepared by mixing or blending the components of the suspension composition to form the homogenous suspension.

The suspension composition can function as a suspending agent in the wellbore servicing fluid. Generally, a suspending agent is a substance that prevents particulates (e.g., a cementitious material, a weighting agent, etc.) from settling in the wellbore servicing fluid during storage and/or before reaching a downhole target (e.g., a portion of the wellbore and/or subterranean formation).

The particulate material is substantially insoluble in the organic carrier fluid. In embodiments, the particulate material can be characterized by a solubility in the organic carrier fluid of less than about 100 mmol/L, alternatively less than about 50 mmol/L, alternatively less than about 25 mmol/L, alternatively less than about 10 mmol/L, alternatively less than about 1 mmol/L, alternatively less than about 0.1 mmol/L, alternatively less than about 0.01 mmol/L, or alternatively less than about 0.001 mmol/L. The particulate material may comprise a water-interactive material and/or a water-insoluble material. While the current disclosure is discussed in detail in the context of the suspension composition comprising a water-interactive material and/or a water-insoluble material, it should be understood that any material that is substantially insoluble in the organic carrier fluid may be used as the particulate material in the suspension composition.

In embodiments, the particulate material may comprise a water-interactive material. While the water-interactive material is substantially insoluble in the organic carrier fluid, the water-interactive material may react with water and/or be water soluble. For example, the water-interactive material can be substantially insoluble in the organic carrier fluid (e.g., characterized by a solubility in the organic carrier fluid of less than about 10 mmol/L) and can be soluble in water (e.g., characterized by a solubility in water of equal to or greater than about 10 mmol/L, alternatively equal to or greater than about 100 mmol/L, or alternatively equal to or greater than about 1 mol/L). As another example, the water-interactive material can be substantially insoluble in the organic carrier fluid (e.g., characterized by a solubility in the organic carrier fluid of less than about 10 mmol/L) and can interact with water, whereby the water-interactive material is consumed once in contact with water (e.g., by dissolution in water; by reacting with water and/or aqueous solution components). Suspension compositions as disclosed herein comprising a particulate material comprising a water-interactive material enable suspending the water-interactive material in aqueous-compatible suspensions, when the formation of water suspensions is not feasible owing to the intrinsic material properties of the particulate material with respect to water. For example, attempting to form aqueous suspensions of water-interactive materials can significantly and undesirably increase the viscosity of the aqueous suspension, thereby undesirably limiting the aqueous suspensions to relatively low concentrations of water-interactive material.

In embodiments, the water-interactive material may comprise an expansion agent, a viscosifying clay, a delayed viscosifier, a fluid loss agent, and the like, or combinations thereof.

The expansion agents may comprise alkali metal oxides, alkaline earth metal oxides, metal powders, and the like, or combinations thereof. For example, the expansion agents may comprise magnesium oxide, lightly burned magnesium oxide, hard burned magnesium oxide, deadburned magnesium oxide, aluminum powder, a gypsum blend (e.g., a calcium aluminate/calcium sulfate blend), and the like, or combinations thereof. Expansion agents can provide for a bulk volumetric increase of a composition, for example a cementitious composition comprising an expanding agent may exhibit a bulk volumetric increase upon setting. For example, an expansion agent may be any material that enables a gas to become incorporated into the cement composition.

The viscosifying clay and the delayed viscosifier are viscosifiers for aqueous solutions, but do not substantially increase the viscosity of the suspension composition. The suspension composition acts as a carrier for the particulate material comprising the viscosifying clay and/or the delayed viscosifier, such that the viscosifying clay and/or the delayed viscosifier may increase the viscosity of a wellbore servicing fluid, such as a cementitious fluid or a spacer fluid. The viscosifying clay may comprise bentonite, sepiolite, hectorite, and the like, or combinations thereof. The delayed viscosifier may comprise crosslinked materials, such as crosslinked guar, crosslinked vinyl alcohols, crosslinked acrylamide polymers, and the like, or combinations thereof.

In embodiments, the particulate material comprises a crosslinked guar. A crosslinked guar, also referred to as crosslinked guar gum, can be formed by crosslinking guar gum molecules by a crosslinker. Guar gum (GG) is a galactomannan polysaccharide extracted from guar beans that has thickening and stabilizing properties. Guar gum can be prepared by mechanically and/or chemically treating guar beans to liberate the guar seed endosperm, or "guar splits," from the guar beans. Guar splits primarily comprise a polymannose backbone with galactose side chains and mannose, and contain a fair concentration of contaminates, such as cellulose, protein, and glycolipids. The guar splits are generally treated under relatively high pressures and temperatures with chemicals, after which treated guar splits are subjected to multiple washings to remove impurities and salts (which are byproducts of some of the treatments) from the guar splits. The treated and washed guar splits are then ground and dried to yield guar gums. Guar gum molecules can be crosslinked by crosslinkers to form crosslinked guar gums. Nonlimiting examples of crosslinkers suitable for crosslinking guar gum include chromium, aluminum, antimony, zirconium, boron, and the like, or combinations thereof. For example, without being limited by theory, boron, in a form of $B(OH)_4$, reacts with hydroxyl groups of guar gum molecules in a two-step process to link two guar molecule strands together.

The fluid loss agent may comprise an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethylacrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N-N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof, and the like, or combinations thereof. Generally, a fluid loss agent may control the loss of fluid to a wellbore and/or subterranean formation.

In embodiments, the particulate material may comprise a water-insoluble material; such as pozzolana cement, sand, a weighting agent (e.g., an iron oxide, such as hematite; a manganese oxide, such as hausmannite; a titanium-iron oxide, such as ilmenite, etc.), a fiber (e.g., carbon fiber, acrylonitrile fiber, polypropylene fiber, rubber fiber, glass fiber, etc.), a rubber particle; a hollow glass sphere; a hollow pozzolanic sphere; a glass bubble; a glass ball; a ceramic ball; graphite; pozzolan; pumice; trass; clay; calcined clay; silica, fume silica, amorphous silica, micro-sized silica, nano-sized silica; and the like; or combinations thereof. A weighting agent can increase a density of a fluid. Fibers suitable for use as particulate material in the present disclosure can be further characterized by any suitable aspect ratio. The aspect ratio of a fiber may be calculated by dividing the length of the fiber by the diameter of the fiber. For example, fibers suitable for use as a particulate material as disclosed herein may be characterized by an aspect ratio of equal to or greater than about 2:1, alternatively equal to or greater than about 5:1, or alternatively equal to or greater than about 10:1.

In embodiments where the particulate material comprises a water-insoluble material, the suspension composition as disclosed herein does not require the use of a biocide (although a biocide may be used), while an aqueous suspension comprising the water-insoluble material would necessitate the use of a biocide to mitigate shelf life issues due to degradation of the aqueous suspension over time. Organic carrier fluids as disclosed herein may be biocidic when largely water-free.

In embodiments, the particulate material can be characterized by a particle size of from about 1 nm to about 10,000 µm, alternatively about 10 nm to about 9,000 µm, alternatively from about 0.1 µm to about 7.500 µm, alternatively about 0.5 µm to about 5,000 µm, or alternatively about 1 µm to about 1,000 µm. For purposes of the disclosure herein, the particle size refers to the largest dimension of any two-dimensional cross section through the particle. Nonlimiting examples of particulate material shapes suitable for use in the present disclosure include cylindrical, discoidal, spherical, tabular, ellipsoidal, equant, irregular, cubic, acicular, and the like, or combinations thereof.

In embodiments, the particulate material can be present in the suspension composition in an amount of from about 1 wt. % to about 80 wt. %, alternatively from about 1 wt. % to about 70 wt. %, alternatively from about 1 wt. % to about 60 wt. %, alternatively from about 1 wt. % to about 50 wt. %, alternatively from about 5 wt. % to about 40 wt. %, alternatively from about 10 wt. % to about 30 wt. %, alternatively from about 10 wt. % to about 80 wt. %, alternatively from about 20 wt. % to about 70 wt. %, alternatively from about 30 wt. % to about 60 wt. %, or alternatively from about 40 wt. % to about 55 wt. %, based on a total weight of the suspension composition.

In some embodiments, the crosslinked guar can be present in the suspension composition in an amount of from about 1 wt. % to about 50 wt. %, alternatively from about 5 wt. % to about 50 w-t. %, alternatively from about 5 wt. % to about 40 w-t. %, or alternatively from about 10 wt. % to about 30 wt %, based on a total weight of the suspension composition.

The organic carrier fluid may comprise a glycol and/or a glycol ether. Glycols suitable for use in the present disclosure may comprise monoethylene glycol (MEG, also known as ethylene glycol), propylene glycol, butylene glycol, and the like, or combinations thereof. Generally, when substantially water-free, glycols may be biocidic, and consequently the use of a biocide in the suspension composition may be unnecessary. In embodiments, the organic carrier fluid as disclosed herein excludes a polyol, which is an organic compound containing multiple hydroxyl groups, such as 3 or more hydroxyl groups. For example, the organic carrier fluid as disclosed herein excludes a polyethylene glycol (PEG). Glycol ethers suitable for use in the present disclosure may comprise methyl ethers and/or ethyl ethers of the glycols that are suitable for use as organic carrier fluid as disclosed herein. For example, glycol ethers suitable for use in the present disclosure may comprise ethylene glycol monomethyl ether, ethylene glycol monoethyl ether, propylene glycol monomethyl ether, propylene glycol monoethyl ether, butylene glycol monomethyl ether, butylene glycol monoethyl ether, and the like, or combinations thereof. The glycol and/or a glycol ether that are suitable for use as organic carrier fluid in the suspension compositions as disclosed herein may degrade within a few weeks upon contacting seawater.

The organic carrier fluid is water miscible. As opposed to an oil (e.g., oleaginous fluid), the organic carrier fluids as disclosed herein are water miscible, such that a compatibilizer-type material (e.g., a surfactant) is not necessary in order to be able to homogenously mix the suspension composition with an aqueous fluid (e.g., an aqueous wellbore servicing fluid). Further, in certain applications, oleaginous fluid may be undesirable.

In embodiments, the organic carrier fluid comprises MEG. MEG, also referred to as ethylene glycol, is an organic compound characterized by the formula $(CH_2OH)_2$. Pure MEG is an odorless and colorless liquid at room temperature and is miscible in water. MEG biodegrades relatively quickly in soil (e.g., half-life of about 2-12 days), surface water (e.g., half-life of about 2-12 days), and ground water (e.g., half-life of about 4-24 days). MEG can be used as an organic carrier fluid in the suspension composition and can degrade within a few weeks upon contacting seawater.

In embodiments, the organic carrier fluid can be present in the suspension composition in an amount of from about 20 wt. % to about 98.99 wt. %, alternatively from about 30 wt. % to about 98.99 wt. %, alternatively from about 40 wt. % to about 98.99 wt. %, alternatively from about 50 wt. % to about 98.99 wt. %, alternatively from about 60 wt. % to about 95 wt. %, alternatively from about 70 wt. % to about 90 wt. %, alternatively from about 20 wt. % to about 90 wt. %, alternatively from about 30 wt. % to about 80 wt. %, alternatively from about 40 wt. % to about 70 wt. %, or alternatively from about 45 wt. % to about 60 wt. %, based on a total weight of the suspension composition.

In some embodiments, MEG can be present in the suspension composition in an amount of from about 49 wt. % to about 98.99 wt. %, alternatively from about 49 wt. % to about 95 wt. %, alternatively from about 59 wt. % to about 94 wt. %, or alternatively from about 69 wt. % to about 89 wt. %, based on a total weight of the suspension composition.

The suspension composition may comprise a suspension viscosifier. In embodiments, the suspension viscosifier functions as a suspending agent in the suspension composition. The suspension viscosifier herein can also be referred to as a viscosifying suspending agent. Without being limited by theory, the suspension viscosifier can prevent the particulate material (e.g., crosslinked guar) from settling in the suspension composition after preparation. In embodiments, the suspension viscosifier comprises Guar gum, Xanthan gum. Welan gum, Diutan, hydroxyethyl cellulose (HEC), modified cellulose, diatomaceous earth, starch, modified/crosslinked starch, viscoelastic surfactants (VES), precipitated silica, derivatives thereof, and the like, or combinations thereof.

The suspension viscosifier can be present in the suspension composition in an amount of from about 0.01 wt. % to about 20 wt. %, alternatively from about 0.05 wt. % to about 20 wt. %, alternatively from about 0.05 wt. % to about 15 wt. %, or alternatively from about 0.1 wt. % to about 10 wt. %, based on a total weight of the suspension composition.

In embodiments, the suspension composition can comprise water. The water can be selected from a group including freshwater, seawater, saltwater, brine (e.g., underground natural brine, formulated brine, etc.), and combinations thereof. Generally, the water may be from any source, provided that it does not contain an amount of components that may undesirably affect the other components in the suspension composition. The water can be present in the suspension composition in an amount effective to provide a suspension composition having desired rheological properties. In embodiments, the water can be present in the suspension composition in an amount of from about 0 wt. % to about 30 wt. %, alternatively from about 5 wt. % to about 30 wt. %, or alternatively from about 10 wt. % to about 30 wt. %, based on a total weight of the suspension composition.

In embodiments of the suspension composition comprising water, the suspension composition may further comprise a biocide. A biocide refers to a diverse group of substances including preservatives, insecticides, disinfectants, pesticides, and the like, or combinations thereof used for the control of organisms that are harmful to human or animal health or that cause damage to natural or manufactured products, according to the US Environmental Protection Agency (EPA). In the European legislation, a biocide is defined as a chemical substance or microorganism intended to destroy, deter, render harmless, or exert a controlling effect on any harmful organism. In embodiments, the biocide comprises 3,3'-methylenebis[5-methyloxazolidine]. A nonlimiting example of a biocide suitable for use in the present disclosure is GROTAN® OX broad spectrum bactericide and fungicide, which is a type of organic, non-oxidizing, formaldehyde-releasing biocide, and a preservative for control of microbial growth commercially available from VINK Chemicals.

In embodiments, a biocide can be present in the suspension composition in an amount of from about 0 wt. % to about 1 wt. %, alternatively from about 0.1 wt. % to about 0.9 wt. %, or alternatively from about 0.2 wt. % to about 0.8 wt. %, based on the total weight of the suspension composition.

In embodiments, the suspension composition can comprise a particulate material (e.g., a crosslinked guar), an organic carrier fluid (e.g., monoethylene glycol (MEG)), and a suspension viscosifier. In some embodiments, the suspension composition can comprise a particulate material (e.g., a crosslinked guar), an organic carrier fluid (e.g., monoethylene glycol (MEG)), a suspension viscosifier, and water; alternatively a particulate material (e.g., a crosslinked guar), an organic carrier fluid (e.g., monoethylene glycol (MEG)), a suspension viscosifier, and a biocide; or alternatively a particulate material (e.g., a crosslinked guar), an organic carrier fluid (e.g., monoethylene glycol (MEG)), a suspension viscosifier, water, and a biocide.

In embodiments, the suspension composition is a substantially homogenous mixture (e.g., a suspension) in which the particulate material (e.g., a crosslinked guar) does not dissolve, but gets uniformly suspended throughout the bulk of the organic carrier fluid (e.g., MEG). For example, the particulate material (e.g., a crosslinked guar) can be uniformly dispersed (e.g., floating around freely) in the suspension composition. A discontinuous internal phase (e.g., particulate material such as crosslinked guar) of the suspension composition can be uniformly dispersed throughout a continuous organic carrier fluid (e.g., MEG) external phase of the homogenous suspension composition through preparation (e.g., mixing or blending), with the use of a viscosifying suspending agent (e.g., the suspension viscosifier).

In embodiments, the suspension composition has a density of from about 9 pounds per gallon (ppg) to about 12 ppg, alternatively from about 9.2 ppg to about 11.5 ppg, or alternatively from about 9.5 ppg to about 11 ppg.

In embodiments, the suspension composition has a specific gravity of from about 0.5 to about 3, alternatively from about 0.8 to about 2.5, alternatively from about 1 to about 2, alternatively from about 1.1 to about 1.4, alternatively from about 1.1 to about 1.3, alternatively from about 1.12 to about 1.28, or alternatively from about 1.14 to about 1.26.

In embodiments, a 1 vol. % dilution of the suspension composition in water has a pH1 in a range of from about 4 to about 12, alternatively from about 5 to about 11, or alternatively from about 6 to about 9.

In embodiments, the suspension composition has a Brookfield viscosity of from about 50 cP to about 600 cP, alternatively from about 75 cP to about 500 cP, or alternatively from about 100 cP to about 400 cP, wherein the viscosity is measured at 75° F. and 100 rpm.

In embodiments, the suspension composition has a flash point of equal to or greater than about 230° F., alternatively equal to or greater than about 240° F. or alternatively equal to or greater than about 250° F.

In embodiments, the suspension composition has a freezing point of from about 8° F. to about 24° F., alternatively from about 9° F. to about 19° F., or alternatively from about 10° F. to about 14° F.

In embodiments, the suspension composition has a boiling point of from about 210° F. to about 410° F., alternatively from about 380° F. to about 405° F. alternatively from about 385° F. to about 405° F., or alternatively from about 390° F. to about 400° F.

In embodiments, the suspension composition stays substantially homogeneous and in a pourable fluid form during a storage period after being prepared. During the storage period, the suspension composition can be kept static and the densities of samples from different portions of the suspension composition can have a difference between each other of equal to or less than about 10%, alternatively equal to or less than about 8%, or alternatively equal to or less than about 5%. The storage period can be equal to or greater than about 1 day, alternatively equal to or greater than about 7 days, alternatively equal to or greater than about 14 days, alternatively equal to or greater than about 21 days, or alternatively equal to or greater than about 28 days.

In embodiments, a suspension composition of the type disclosed herein can be prepared using any suitable method. For example, a method of the present disclosure can comprise contacting components of the suspension composition (e.g., a particulate material, such as a crosslinked guar; an organic carrier fluid, such as MEG; suspension viscosifier; and optionally water; biocide; etc.) to form the suspension composition. The contacting can comprise placing the components into a suitable suspension container (e.g., a mixer, a blender, a sonicator, a bid mill, a homogenizer) to form a suspension mixture, and blending the suspension mixture until the suspension mixture becomes a pumpable fluid (e.g., a suspension composition). The suspension container can be any container that is compatible with the suspension mixture and has sufficient space for the suspension mixture. A blender can be used for blending.

In embodiments, a suspension composition of the type disclosed herein can be prepared by contacting a suspension viscosifier and an organic carrier fluid. The contacting can comprise placing the components into a suitable suspension container (e.g., a mixer, a blender, a sonicator, a bid mill, a homogenizer) to form a base mixture which can be characterized as a clear solution. The base mixture can then be contacted with a material to be dispersed which is then mixed, as described herein, to form a uniform suspension comprising the particulate material. In some embodiments, the uniform suspension may be contacted with water, alternatively a biocide, or alternatively water and a biocide to form a suspension composition.

In embodiments, a suspension composition of the type disclosed herein can be prepared by contacting a suspension viscosifier and organic carrier fluid (e.g., MEG). The contacting can comprise placing the components into a suitable suspension container (e.g., a mixer, a blender, a sonicator, a bid mill, a homogenizer) to form a base mixture which can be characterized as a clear solution. The base mixture can then be contacted with a crosslinked guar which is then mixed, as described herein, to form a uniform suspension. In some embodiments, the uniform suspension may be contacted with water, alternatively a biocide, or alternatively water and a biocide to form a suspension composition.

The suspension composition as disclosed herein can be used in any suitable fluid, such as a wellbore servicing fluid. In embodiments, the wellbore servicing fluid may comprise a cementitious fluid. In embodiments, the wellbore servicing fluid may comprise a spacer fluid.

In embodiments, the suspension composition can be prepared at the wellsite. Components of the suspension composition can be transported to the wellsite and combined (e.g., mixed/blended) proximate the wellsite to form the suspension composition. The components of the suspension composition can be pre-combined such that the suspension composition is prepared at a location remote from the wellsite and transported to the wellsite, and, if necessary, stored at an on-site location for use in making a wellbore servicing fluid. When it is desirable to prepare the suspension composition at the wellsite, the components of the suspension composition can be added into a suspension container (e.g., a blender tub, for example mounted on a trailer), and the suspension mixture is then blended until the suspension mixture becomes a pumpable fluid (e.g., a suspension composition). In some other embodiments, the suspension composition is prepared at a location remote from the wellsite, transported to the wellsite, optionally stored at the wellsite and combined with water, and other necessary components (e.g., a cement blend), and optionally one or more additives, such as weighting agents, or weight-reducing agents to form a wellbore servicing fluid. Transporting of the suspension composition and/or the components of the suspension composition can be done by a ship, a pipeline, tanker truck, or any suitable transportation method.

In embodiments, the suspension composition can be present in a wellbore servicing fluid in an amount ranging from about 0.1 wt. % to about 60 wt. %, alternatively from about 0.1 wt. % to about 40 wt. %, alternatively from about 0.1 wt. % to about 20 wt. %, alternatively from about 0.5 wt. % to about 10 wt. %, or alternatively from about 1 wt. % to about 5 wt., based on the total weight of the wellbore servicing fluid.

In embodiments, the wellbore servicing fluid (e.g., cementitious fluid; spacer fluid) further comprises one or more additives. The one or more additives may comprise a defoamer, a cement retarder, a cement dispersant, a fluid loss control additive, a fume silica, a free fluid control additive, a viscosifying agent, an acid, a base, an emulsifier, a salt, a corrosion inhibitor, a mutual solvent, a conventional breaking agent, a relative permeability modifier, lime, a gelling agent, a crosslinker, a flocculant, a water softener, a proppant, an oxidation inhibitor, a thinner, a scavenger, a gas scavenger, a lubricant, a friction reducer, a bridging agent, a vitrified shale, a thixotropic agent, a surfactant, a scale inhibitor, a clay, a clay control agent, a clay stabilizer, a silicate-control agent, a biostatic agent, a storage stabilizer, a filtration control additive, a foaming agent, a foam stabilizer, latex emulsions, a formation conditioning agent, elastomers, gas/fluid absorbing materials, resins, superabsorbers, mechanical property modifying additives, inert particulates, and the like, or combinations thereof.

A wellbore servicing fluid (e.g., cementitious fluid; spacer fluid) of the type disclosed herein can exclude a biocide. In embodiments, a wellbore servicing fluid of the type disclosed comprises equal to or less than about 1%, 0.1%, 0.001%, 0.0001%, 0.00001%, 0.000001%, or 0.0000001% biocide, based on the total weight of the wellbore servicing fluid. In embodiments, components of the wellbore servicing fluid (e.g., the particulate material, such as the crosslinked guar; the organic carrier fluid, such as the MEG; the cementitious material; the one or more additives; etc.) are materials described to Pose Little or No Risk to the Environment (PLONOR). The PLONOR list is an OSPAR (Oslo and Paris Conventions) list of substances and/or preparations used and discharged offshore that are deemed to cause no or little harm to the environment. In other words, the components of the wellbore servicing fluid are PLONOR materials. In embodiments, the wellbore servicing fluid comprises, consists essentially of, or consists of PLONOR materials. In embodiments, a wellbore servicing fluid of the type disclosed herein excludes any material that does not have a PLONOR designation (i.e., materials that are not on the PLONOR list). In embodiments, a wellbore servicing fluid of the type disclosed comprises equal to or less than about 25%, 20%, 15%, 10%, 5%, 1%, 0.1%, 0.001%, 0.0001%, 0.00001%, 0.000001%, or 0.0000001% non-PLONOR materials based on the total weight of the wellbore servicing fluid.

The wellbore servicing fluid (e.g., cementitious fluid; spacer fluid) can be used in a wellbore having a Bottomhole Circulating Temperature (BHCT) from about 70° F. to about 400° F. alternatively from about 120° F. to about 400° F., or alternatively from about 160° F. to about 370° F. In embodiments, the wellbore servicing fluid is used in a wellbore having a Bottomhole Static Temperature (BHST) from about 100° F. to about 400° F. alternatively from about 150° F. to about 400° F. or alternatively from about 190° F. to about 400° F.

In some embodiments, the wellbore servicing fluid comprising the suspension composition may be a cementitious fluid. A cementitious fluid refers to the material used to permanently seal an annular space between a casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is less viscous and has less strength than cement or concrete used for construction, since the cementitious fluid is required to be pumpable in a relatively narrow annulus over long distances.

In embodiments, the wellbore servicing fluid (e.g., cementitious fluid) comprises a cement blend. The cement blend can comprise, consist essentially of, or consist of a cementitious material. The cementitious material can comprise Portland cement, pozzolana cement, gypsum cement, shale cement, acid cement, base cement, phosphate cement, high alumina content cement, slag cement, silica cement, high alkalinity cement, magnesia cement, lime, amorphous silica, siliceous material, fly ash, any cementitious material, and the like, or combinations thereof. As used herein, the term "high alumina content cement" refers to a cement having an alumina concentration in the range of from about 40 wt. % to about 80 wt. %, by a weight of the high alumina content cement. The term "high alkalinity cement" refers to a cement having a sodium oxide concentration in the range of from about 1.0 wt. % to about 2.0 wt. %, by a weight of the high alkalinity cement.

In embodiments, the cementitious material is present in the cement blend in an amount of from about 1% BWOB (by weight of blend) to about 100% BWOB, alternatively from about 5% BWOB to about 100% BWOB, alternatively from about 10% BWOB to about 80% BWOB, or alternatively from about 20% BWOB to about 60% BWOB, based on a total weight of the cement blend.

In embodiments, the cement blend further comprises an expansion agent. Without limitation, examples of expansion agents suitable for use in the cement blend of the present disclosure include metal powders, aluminum powder, a gypsum blend, alkali metal oxides, alkaline earth metal oxides, magnesium oxide, lightly burned magnesium oxide, hard burned magnesium oxide, deadburned magnesium oxide, and the like, or combinations thereof.

In embodiments where both the particulate material and the cement blend comprise an expansion agent, the expansion agent of the particulate material and the expansion agent of the cement blend can be the same or different. For example, in some embodiments, both the particulate material and the cement blend can independently comprise lightly burned magnesium oxide. As another example, in some embodiments, the particulate material can comprise aluminum powder, while the cement blend can comprise lightly burned magnesium oxide.

In embodiments, the expansion agent can be present in the cement blend in an amount of from about 1% BWOB to about 10% BWOB, alternatively from about 1.5% BWOB to about 7.5% BWOB, or alternatively from about 2% BWOB to about 5% BWOB, based on a total weight of the cement blend.

In embodiments, the cement blend further comprises one or more cement blend additives. The one or more cement blend additives can comprise quartz flour, bulk flow enhancer, aggregate, particles, filler, amorphous silica, siliceous material, fly ash, and the like, or combinations thereof.

In embodiments, the one or more cement blend additives can be present in the cement blend in an amount of from about 5% BWOB to about 95% BWOB, alternatively from about 5% BWOB to about 80% BWOB, alternatively from about 10% BWOB to about 60% BWOB, or alternatively from about 15% BWOB to about 40% BWOB, based on a total weight of the cement blend.

A cement blend of the type disclosed herein can be prepared using any suitable method. Components of the cement blend can be predetermined. In embodiments, the cement blend comprises more than one component (e.g., a cementitious material, an expansion agent, a bulk flow enhancer, and one or more cement blend additives), which can be dry mixed to form the cement blend. The dry mixing can be at a location away from the wellsite and the cement blend can be transported to the wellsite. In embodiments, the components of the cement blend can be prepared at a location remote from the wellsite and transported to the wellsite, and, if necessary, stored at an on-site location. When desired, the components of the cement blend can be dry mixed at the wellsite. In embodiments, the cement blend contains (e.g., consists essentially of or consists of) one component (i.e., a cementitious material) and can be transported and stored at the wellsite. Transporting of the cement blend and/or the components of the cement blend can be by a ship or any suitable transportation. In embodiments, the components of the cement blend can be added to a dry-mixing container (e.g., a mixing head of a solid feeding system) and be dry mixed therein. The dry-mixing container can be any container that is compatible with the components of the cement blend and has sufficient space for the components of the cement blend. A blender can be used for dry mixing.

In embodiments, the cement blend can be present in the wellbore servicing fluid in an amount ranging from about 20 wt. % to about 90 wt. %, alternatively from about 40 wt. % to about 80 wt. %, or alternatively from about 60 wt. % to about 70 wt. %, based on the total weight of the wellbore servicing fluid.

The wellbore servicing fluid (e.g., cementitious fluid) can comprise water. The water can be selected from a group including freshwater, seawater, saltwater, brine (e.g., underground natural brine, formulated brine, etc.), and combinations thereof. Generally, the water may be from any source, provided that it does not contain an amount of components that may undesirably affect the other components in the wellbore servicing fluid. The water can be present in the wellbore servicing fluid in an amount effective to provide a slurry having desired (e.g., job or service specific) rheological properties. The water can be present in the wellbore servicing fluid in an amount of from about 10 L/100 kg to about 400 L/100 kg, alternatively from about 20 L/100 kg to about 150 L/100 kg, or alternatively from about 30 L/100 kg to about 65 L/100 kg, based on a total weight of the cement blend.

In embodiments, the wellbore servicing fluid (e.g., cementitious fluid) further comprises a weighting agent and/or a weight-reducing agent. In embodiments, a weighting agent and/or a weight-reducing agent may be included within the cement blend (e.g., as part of a dry cement blend or dry cementitious composition) prior to formation of a wellbore servicing fluid by mixing the cement blend with water to form a pumpable cement slurry. A weighting agent can increase a density of the wellbore servicing fluid. Nonlimiting examples of suitable weighting agents for the present disclosure include barium sulfate, (i.e., barite), iron oxide (i.e., hematite), manganese oxide (i.e., hausmannite), and combinations thereof. An example of weighting agent suitable for use in this disclosure includes without limitation a synthetic hausmannite known as MICROMAX® FF weight additive, which is commercially available from Elkem Materials Inc. A weight-reducing agent can reduce a density of the wellbore servicing fluid. Nonlimiting examples of suitable weight-reducing agents suitable for use in the present disclosure include hollow glass and ceramic beads.

In embodiments where both the particulate material and the cement blend comprise a weighting agent, the weighting agent of the particulate material and the weighting agent of the cement blend can be the same or different. For example, in some embodiments, both the particulate material and the cement blend can independently comprise hausmannite. As another example, in some embodiments, the particulate material can comprise ilmenite, while the cement blend can comprise hausmannite.

The amount of the weighting agent or weight-reducing agent in the wellbore servicing fluid (e.g., cementitious fluid) may be an amount effective to produce a desired density of the wellbore servicing fluid. In embodiments, the weighting agent or the weight-reducing agent can be present in the wellbore servicing fluid in an amount of from about 1% BWOB to about 200% BWOB, alternatively from about 5% BWOB to about 150% BWOB, or alternatively from about 10% BWOB to about 100% BWOB, based on a total weight of the cement blend.

In embodiments, the wellbore servicing fluid (e.g., cementitious fluid) comprising a cement blend further comprises a foaming agent. In such embodiments, the wellbore servicing fluid comprising a cement blend forms a foamed cement having a density that is reduced in comparison to an otherwise similar composition prepared in the absence of the foaming agent. The foaming agent may be introduced (e.g., added into the wellbore servicing fluid) prior to placing the wellbore servicing fluid in the wellbore. The addition of a foaming agent to the cement composition may be accomplished by any suitable method. In embodiments, the foaming agent comprises a gas such as air, an inert gas such as nitrogen, and combinations thereof. The gas (e.g., nitrogen) may be introduced by direct injection into the wellbore servicing fluid. In such embodiments, the gas is present in the wellbore servicing fluid in an amount of from about 10 vol. % to about 30 vol. %, based on a total volume of the wellbore servicing fluid placed in the wellbore.

In embodiments, the foamed cement can have a density (e.g., a target density of the wellbore servicing fluid) of from about 5 ppg to about 16 ppg, alternatively from about 8 ppg to about 15 ppg, or alternatively from about 10 ppg to about 14 ppg.

In embodiments, the one or more additives can be present in the wellbore servicing fluid (e.g., cementitious fluid) in a total amount of from about 0.1 L/100 kg to about 50 L/100 kg, based on a total weight of the cement blend, alternatively from about 1 L/100 kg to about 35 L/100 kg, or alternatively from about 5 L/100 kg to about 20 L/100 kg, based on a total weight of the wellbore servicing fluid. Additives suitable for use in the present disclosure may be in solid form and in such embodiments the additive may be included in the wellbore servicing fluid in amounts of from about 0.05% BWOB to about 100% BWOB, alternatively from about 0.5% BWOB to about 50% BWOB, or alternatively from about 5% BWOB to about 20% BWOB, based on a total weight of the cement blend.

In embodiments, the wellbore servicing fluid (e.g., cementitious fluid) has a density of from about 9 pounds per gallon (ppg) to about 26 ppg, alternatively from about 11 ppg to about 22 ppg, or alternatively from about 13 ppg to about 18 ppg.

In embodiments, a wellbore servicing fluid (e.g., cementitious fluid) suitable for use in the present disclosure comprises about 20 wt. % of a cement blend based on the total weight of the wellbore servicing fluid and about 400 L/100 kg of water BWOB and has a density of about 9.6 ppg. In some other embodiments, a wellbore servicing fluid suitable for use in the present disclosure comprises about 40 wt. % of a cement blend based on the total weight of the wellbore servicing fluid and about 150 L/100 kg of water BWOB and has a density of about 11.5 ppg. In some other embodiments, a wellbore servicing fluid suitable for use in the present disclosure comprises about 60 wt. % of a cement blend based on the total weight of the wellbore servicing fluid and about 65 L/100 kg of water BWOB and has a density of about 14.1 ppg. In some other embodiments, a wellbore servicing fluid suitable for use in the present disclosure comprises about 70 wt. % of a cement blend based on the total weight of the wellbore servicing fluid and about 40 L/100 kg of water BWOB and has a density of about 16.0 ppg. In some other embodiments, a wellbore servicing fluid suitable for use in the present disclosure comprises about 75 wt. % of a cement blend based on the total weight of the wellbore servicing fluid and about 35 L/100 kg of water BWOB and has a density of about 17.1 ppg. In yet some other embodiments, a wellbore servicing fluid suitable for use in the present disclosure comprises about 90 wt. % of a cement blend based on the total weight of the wellbore servicing fluid and about 15 L/100 kg of water BWOB and has a density of about 21 ppg.

In embodiments, the wellbore servicing fluid (e.g., cementitious fluid) has a specific gravity of from about 0.5 to about 3, alternatively from about 1.1 to about 2.5, alternatively from about 1.3 to about 2.3, or alternatively from about 1.5 to about 2.0.

In embodiments, the wellbore servicing fluid (e.g., cementitious fluid) has a mixability rating of from about 3 to about 5, alternatively from about 4 to about 5. The mixability rating is on a 0 to 5 scale, where 0 is not mixable and 5 is fully mixable.

In embodiments, the wellbore servicing fluid (e.g., cementitious fluid) has a fluid loss of from about 10 ml per 30 minutes to about 250 ml per 30 minutes, alternatively from about 20 ml per 30 minutes to about 100 ml per 30 minutes, or alternatively from about 30 ml per 30 minutes to about 50 ml per 30 minutes, when measured on a 325 mesh screen at about 129° F. and 1.000 psig differential pressure in accordance with a test standard API-RP-10B-2.

In embodiments, the wellbore servicing fluid (e.g., cementitious fluid) has a 10-second static gel strength of from about 1 to about 50, alternatively from about 5 to about 40, or alternatively from about 10 to about 30, when measured at about 129° F. in accordance with the test standard API-RP-10B-2. In embodiments, the wellbore servicing fluid has a 10-minute static gel strength of from about 1 to about 300, alternatively from about 5 to about 150, or alternatively from about 10 to about 75, when measured at about 129° F. in accordance with the test standard API-RP-10B-2.

In embodiments, the wellbore servicing fluid (e.g., cementitious fluid) has a thickening time of from about 3 hour to about 24 hours, alternatively from about 4 hours to about 16 hours, or alternatively from about 5 hours to about 8 hours, when measured in accordance with the test standard API-RP-10B-2 to achieve about 70 Bearden units (Bc) at about 129° F. and 5.000 psig.

In embodiments, the wellbore servicing fluid (e.g., cementitious fluid) has a 50 psi Ultrasonic Cement Analyzer (UCA) compressive strength of from about 1 hour to about 48 hours, alternatively from about 4 hours to about 24 hours, or alternatively from about 6 hours to about 18 hours, when measured at about 168° F. and 5.000 psig.

In embodiments, the wellbore servicing fluid (e.g., cementitious fluid) has a 500 psi UCA compressive strength of from about 2 hours to about 72 hours at, alternatively from about 6 hours to about 36 hours, or alternatively from about 8 hours to about 24 hours, when measured at about 168° F. and 5.000 psig in accordance with the test standard API-RP-10B-2.

In embodiments, the wellbore servicing fluid (e.g., cementitious fluid) has a 24 hr UCA compressive strength of from about 50 psig to about 10,000 psig, alternatively from about 250 psig to about 6.000 psig, or alternatively from about 500 psig to about 4,000 psig, when measured at about 168° F. and 5,000 psig in accordance with the test standard API-RP-10B-2.

In embodiments, the wellbore servicing fluid (e.g., cementitious fluid) has rheology readings in a range of from about 1 to about 350 at about 68° F., alternatively from about 2 to about 350 at about 129° F., or alternatively from about 2 to about 350 at about 190° F. when measured by a Fann® Model 35 viscometer at a speed of 3 rpm to 300 rpm in accordance with the test standard API-RP-10B-2.

In embodiments, after being cured at about 212° F. and 5.000 psig for about 7 days, the wellbore servicing fluid (e.g., cementitious fluid) forms a set cement having a crush compressive strength of from about 500 psig to about 12,000 psig, alternatively from about 1,500 psig to about 9,000 psig, or alternatively from about 3,000 psig to about 7,000 psig.

In embodiments, after being cured at about 212° F. and 5.000 psig for about 7 days, the wellbore servicing fluid (e.g., cementitious fluid) forms a set cement having a Young's Modulus of from about 0.3 Mpsig to about 3 Mpsig, alternatively from about 0.8 Mpsig to about 2 Mpsig, or alternatively from about 1.2 Mpsig to about 1.6 Mpsig.

In embodiments, after being cured at about 212° F. and 5,000 psig for about 7 days, the wellbore servicing fluid (e.g., cementitious fluid) forms a set cement having a Brazilian Tensile Strength of from about 50 psig to about 1.600 psig, alternatively from about 100 psig to about 900 psig, or alternatively from about 200 psig to about 700 psig.

In some embodiments, the wellbore servicing fluid comprising the suspension composition may be a spacer fluid. In embodiments, the spacer fluid as disclosed herein may comprise the suspension composition and a base fluid, and optionally any suitable additives. The base fluid may comprise water or an aqueous fluid. Alternatively, the base fluid may comprise a hydrocarbon fluid such as mud base oil, diesel, etc. A spacer fluid is generally used to physically separate one special purpose liquid from another, and a spacer fluid should be compatible with each of the special purpose fluids. For example, a spacer fluid can separate a drilling fluid from a cementitious fluid. The spacer fluid may have a density that is different from the density of the fluids it separates. In embodiments where the spacer fluid separates a drilling fluid from a cementitious fluid, the spacer fluid may have a density that is greater than the density of the drilling fluid, and the spacer fluid may have a density that is lower than the density of the cementitious fluid.

In embodiments, the spacer fluid can have a density in a range of from about 4 ppg to about 25 ppg, alternatively from about 7 ppg to about 21 ppg, or alternatively from about 9 ppg to about 17 ppg.

The spacer fluid can comprise water. The water can be selected from a group including freshwater, seawater, saltwater, brine (e.g., underground natural brine, formulated brine, etc.), and combinations thereof. Generally, the water may be from any source, provided that it does not contain an amount of components that may undesirably affect the other components in the wellbore servicing fluid. The water can be present in the spacer fluid in an amount effective to provide a slurry having desired (e.g., job or service specific) rheological properties. The water can be present in the spacer fluid in an amount of from about 10 wt. % to about 99.9 wt. %, alternatively from about 20 wt. % to about 80 wt. %, or alternatively from about 30 wt. % to about 60 wt. %, based on a total weight of the spacer fluid.

In embodiments where the density of the spacer fluid is relatively low (e.g., about 4 ppg), the spacer fluid may be a foamed fluid, for example comprising a gas such as air, nitrogen, or any other suitable gas; may comprise hollow beads or bubbles, for example glass bubbles; or combinations thereof. In embodiments where the spacer fluid is a foamed fluid, the spacer fluid may comprise a gas (e.g., air, nitrogen, or any other suitable gas) in an amount of from about 1 vol. % to about 90 vol. %, alternatively from about 5 vol. % to about 85 vol. %, or alternatively from about 10 vol. % to about 80 vol. %, based on the total volume of the spacer fluid.

A wellbore servicing fluid of the type disclosed herein can be prepared using any suitable method. In embodiments, a method of making the wellbore servicing fluid comprises contacting water with the suspension composition, and optionally cement blend and/or additives to form the wellbore servicing fluid.

In embodiments, the wellbore servicing fluid (e.g., cementitious fluid; spacer fluid) can be prepared at the wellsite. Components of the wellbore servicing fluid can be transported to the wellsite and combined (e.g., mixed/blended) proximate the wellsite to form the wellbore servicing fluid. The components of the wellbore servicing fluid can be added into a container (e.g., a blender tub, for example mounted on a trailer), and the wellbore servicing fluid is then blended until the wellbore servicing fluid becomes a pumpable fluid.

The methods disclosed herein for preparing the wellbore servicing fluid (e.g., cementitious fluid; spacer fluid) can comprise a continuous process (also referred to as an "on-the-fly" process). A continuous process or an "on-the-fly" process means one or more steps in the process are running on a continuous basis. For example, a contacting step can be continuous in which wellbore servicing fluid components are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process. The continuous process can be performed by using proper equipment (e.g., a mixer, a blender, feeders, pumps, etc.) and process management/control. For example, forming the suspension composition can be continuous using pumps and a blender; forming the cement blend can be continuous using a blender and solid feeders; conveying water, the suspension composition, and/or the one or more additives can be continuous using pumps; combining the cement blend with a mixture in the container can be continuous using a feeder; blending the cementitious fluid in the container can be continuous by generating a whirlpool continuously; and any combination thereof may be employed in a continuous process of the type described herein. As another example, the suspension composition can be contacted with water and optional additives in a container on a continuous basis to yield a continuous output of the spacer fluid from the container.

In embodiments, a spacer fluid of the type disclosed herein can be prepared using any suitable method. Generally, spacer fluids may be prepared in a pit or any suitable tank by recirculating and/or agitating. Usually, spacer fluids may be prepared at the well site; although spacer fluids may be prepared remotely and then transported to the well site. For example, a method of the present disclosure can comprise contacting components of the spacer fluid (e.g., a suspension composition; water; optional additives) to form the spacer fluid at a location proximate a wellsite. The wellsite can comprise an offshore platform (e.g., an offshore oil and gas platform) and/or a floating vessel and the wellbore can be offshore. The contacting of the components of the spacer fluid can comprise placing the components into a suitable spacer fluid container (e.g., a mixer, a blender, a sonicator, a bid mill, a homogenizer) to form a spacer fluid mixture, and blending the spacer fluid mixture until the spacer fluid mixture becomes a pumpable fluid (e.g., a spacer fluid). The spacer fluid container can be any container that is compatible with the spacer fluid and has sufficient space for the spacer fluid. A blender can be used for blending. The spacer fluid container may provide a continuous spacer fluid output.

In embodiments, a cementitious fluid of the type disclosed herein can be prepared using any suitable method. In embodiments, a method of making the cementitious fluid comprises contacting water with the suspension composition and a cement blend prepared using the methods disclosed hereinabove at a location proximate a wellsite. The wellsite can comprise an offshore platform (e.g., an offshore oil and gas platform) and/or a floating vessel and the wellbore can be offshore. FIG. 1 depicts a process flow diagram of a method 200 of making a wellbore servicing fluid (e.g., cementitious fluid) of the type disclosed herein. Referring to FIG. 1, the water can be conveyed via a water flow line 201 from any resource, for example, seawater around the wellsite, produced water, and water conveyed from onshore. The method can comprise contacting a suspension composition of the type disclosed herein with water to form a mixture. Contacting the suspension composition with water can comprise conveying (e.g., via a suspension flow line 202) the suspension composition into the water in the water flow line 201. In some embodiments, a liquid suspension aid (e.g., suspension viscosifier) may be added directly into the mixing water (e.g., water flow line 201). The combination of water and the suspension composition can be referred to as a diluted suspension composition or a first mixture. In embodiments, one or more additives of the type disclosed herein optionally can be added into the first mixture in a mixture flow line 205, for example by conveying the one or more additives (e.g., via one or more additive flow lines 204) into the first mixture in the mixture flow line 205 to form a second mixture. In some embodiments, the fluid flowing via the mixture flow line 205 may be formulated and used as a spacer fluid. After contacting the suspension composition with water to form the first mixture, and optionally adding the one or more additives into the first mixture to form the second mixture, the first or second mixture can be further contacted with a cement blend prepared using the methods disclosed hereinabove. In embodiments, the first or second mixture is conveyed via the mixture flow line 205 to a container. The container can be any container that is compatible with the first or second mixture and the cement blend and has sufficient space. The cement blend can be added (e.g., metered by a solids feeding system such as a conveyor or auger) into the container and blended with the first or second mixture. The blending can be conducted using any suitable method/tool (e.g., a blender) until a pumpable fluid (e.g., the wellbore servicing fluid; cementitious fluid) is formed. In embodiments, the blending comprises generating whirlpools (e.g., vortexes) in the cementitious fluid. Whirlpools can be generated by any suitable method, for example by a nozzle that releases a jet of the contents of the container therein (e.g., a pump-around loop). In embodiments, prior to and/or concurrent with contacting the cement blend with the first or second mixture, the method further comprises adding a weighting agent or a weight-reducing agent to the cement blend, to the first mixture, to the second mixture, directly to the container, or any combination thereof. The weighting agent or the weight-reducing agent can be placed into the container having the other components of the wellbore servicing fluid therein.

The methods disclosed herein for preparing the cementitious fluid can comprise a continuous process (also referred to as an "on-the-fly" process). For example, a contacting step can be continuous in which the cement blend and the first or second mixture are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process of making the cementitious fluid. The continuous process of making the cementitious fluid can be performed by using proper equipment (e.g., a mixer, a blender, feeders, pumps, etc.) and process management/control. For example, forming the suspension composition can be continuous using pumps and a blender; forming the cement blend can be continuous using a blender and solid feeders; conveying water, the suspension composition, and/or the one or more additives can be continuous using pumps; combining the cement blend with the first or second mixture in the container can be continuous using a feeder; blending the wellbore servicing fluid in the container can be continuous by generating a whirlpool continuously; and any combination thereof may be employed in a continuous process of the type described herein.

Figure 2:
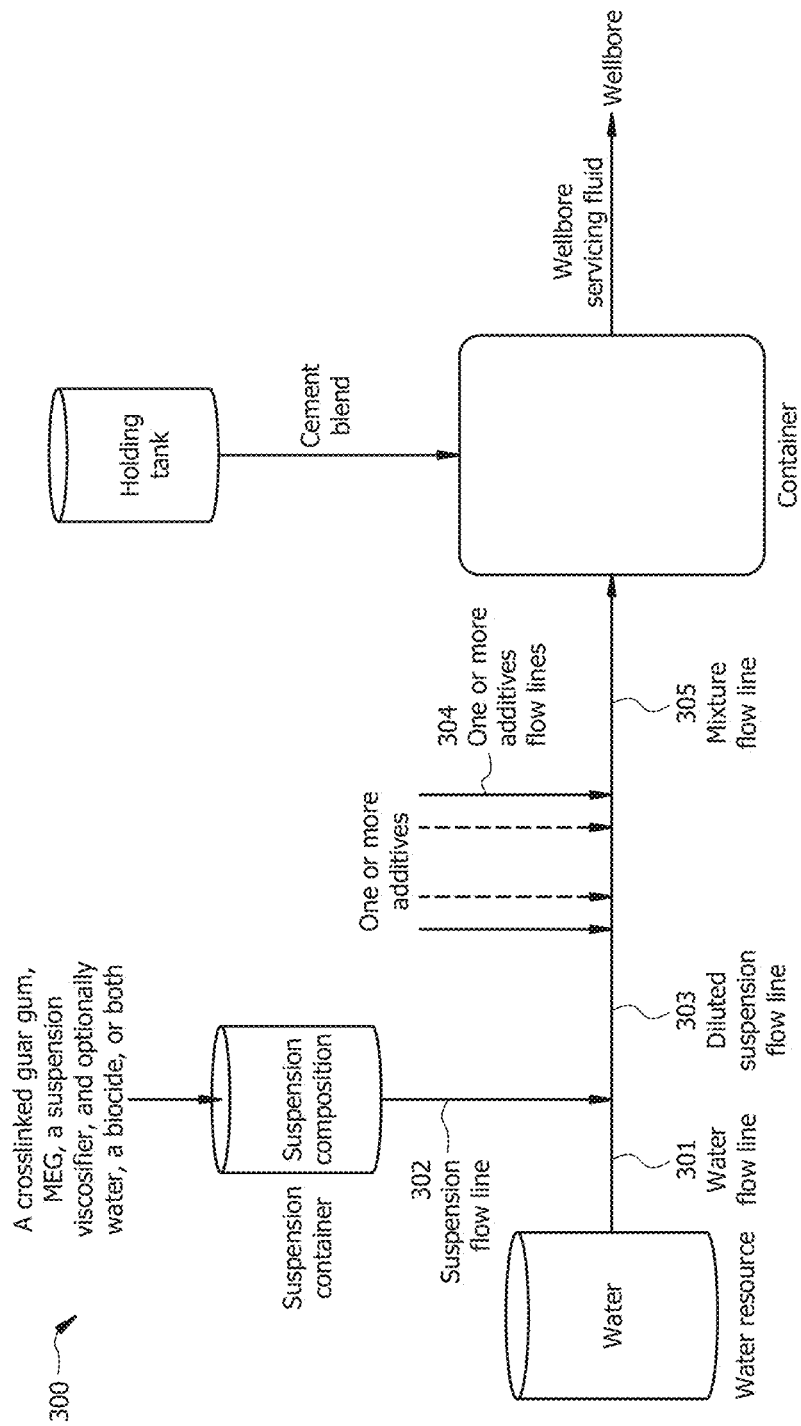
FIG. 2 is a process flow diagram according to some embodiments of the disclosure.

In embodiments, referring to FIG. 2, a method 300 disclosed herein comprises contacting a particulate material (e.g., a crosslinked guar), an organic carrier fluid (e.g., MEG), a suspension viscosifier of the types disclosed herein, and optionally water, a biocide, or both, to form a suspension composition of the type disclosed herein. The contacting can be in a suspension container, and can occur proximate a wellsite or remote from a wellsite (e.g., prepared remotely and transported to a wellsite such as an offshore platform or a floating vessel). The method can take place at a location proximate an offshore platform and/or a floating vessel, where a water flow line 301 conveys water from a water resource (e.g., seawater around the offshore platform or the floating vessel). The method can further comprise conveying the suspension composition via a suspension flow line 302 into the water in the water flow line 301 to form a diluted suspension. In some embodiments, a liquid suspension aid (e.g., suspension viscosifier) may be added directly into the mixing water (e.g., water flow line 301). In embodiments, the method further comprises conveying one or more additives via one or more additive flow lines 304 into the diluted suspension in a diluted suspension flow line 303 to form a mixture in a mixture flow line 305. One or more pumps can be used on each of the water flow line 301, the suspension flow line 302, the diluted suspension flow line 303, the one or more additive flow lines 304, and the mixture flow line 305. In some embodiments, the fluid flowing via the mixture flow line 305 may be formulated and used as a spacer fluid. In other embodiments, the method further comprises placing the mixture in a container (e.g., a mixing container). A cement blend of the type disclosed herein from a cement blend resource (e.g., a holding tank) can be added into the mixture to form a slurry within the container. A solid feeding system (e.g., a solid feeder such as an auger feeder or a screw feeder) can be used for adding the cement blend into the container. The method can further comprise blending the slurry to form a pumpable fluid (e.g., the cementitious fluid). The blending can be by a blender. In embodiments, the blending is by generating whirlpools in the slurry within the container (e.g., by a nozzle in the container that releases a jet of the slurry). The wellbore servicing fluid can then be placed downhole.

In embodiments, a wellbore servicing fluid of the type disclosed herein is used as a cementitious fluid, for example comprising a cement blend of the type disclosed herein. The method of the present disclosure can further comprise placing the wellbore servicing fluid in an offshore wellbore penetrating a subterranean formation and allowing at least a portion of the wellbore servicing fluid to set. The wellbore servicing fluid can be used to permanently seal the annular space between the conduit (e.g., casing) and the wellbore wall or the annular space between two casings. The wellbore servicing fluid can also be used to seal formations to prevent loss of drilling fluid (e.g., in squeeze cementing operations) and for operations ranging from setting kick-off plugs to plug and abandonment of a wellbore.

In embodiments, a wellbore servicing fluid (e.g., cementitious fluid) of the type disclosed herein can be employed in well completion operations such as primary and secondary cementing operations. The cementitious fluid may be placed into an annulus of the wellbore (e.g., an annulus formed between casing and a wellbore wall) and allowed to set such that it isolates the subterranean formation from a different portion of the wellbore. The cementitious fluid thus forms a barrier that prevents fluids in that subterranean formation from migrating into other subterranean formations. Within the annulus, the cementitious fluid also serves to support a conduit, e.g., casing, in the wellbore. In embodiments, the wellbore in which the cementitious fluid is positioned belongs to a multilateral wellbore configuration. It is to be understood that a multilateral wellbore configuration includes at least two principal wellbores connected by one or more ancillary wellbores.

In secondary cementing, often referred to as squeeze cementing, the wellbore servicing fluid (e.g., cementitious fluid) can be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, to plug a permeable zone, and so forth.

In embodiments, a method of servicing a wellbore penetrating a subterranean formation (e.g., offshore wellbore penetrating a subterranean formation) comprises placing a wellbore servicing fluid (e.g., spacer fluid) of the type described herein into the wellbore, wherein the wellbore servicing fluid comprises the suspension composition as disclosed herein. In some embodiments, the method of servicing a wellbore comprises placing (e.g., pumping) a first fluid (e.g., a drilling fluid) into the wellbore, thereafter placing (e.g., pumping) the spacer fluid into the wellbore, and thereafter placing (e.g., pumping) a second fluid (e.g., cementitious fluid) into the wellbore, wherein the spacer fluid physically spaces the first fluid apart from the second fluid such that the first fluid and the second fluid do not comingle while being placed (e.g., pumped) into the wellbore. For example, the spacer fluid can be used to space apart two fluids (e.g., a drilling fluid and a cementitious fluid) that are being flowed from the surface down through a conduit (e.g., casing) present in the wellbore, exiting the conduit and flowing back upward in the annular space between the outside conduit wall and interior face of the wellbore.

In embodiments, a wellbore may have casing disposed therein to form an annular space between the wellbore wall and the outer surface of the casing, wherein a drilling fluid (or other fluid) is present in at least a portion of the annular space. The drilling fluid herein refers to any liquid and gaseous fluid and mixtures of fluids and solids used in operations of drilling a borehole into the earth. The drilling fluid can be a water-based fluid. In embodiments, the method of servicing a wellbore penetrating a subterranean formation comprises placing a spacer fluid into at least a portion of the annular space and displacing at least a portion of the drilling fluid from the annular space, wherein the spacer fluid comprises the suspension composition as disclosed herein, and wherein the density of the spacer fluid is greater than the density of the drilling fluid. In some embodiments, the method of servicing a wellbore penetrating a subterranean formation further comprises placing a cementitious fluid into at least a portion of the annular space and displacing at least a portion of the spacer fluid from the annular space, wherein the density of the cementitious fluid is greater than the density of the spacer fluid.

In embodiments, the spacer fluid (e.g., comprising the suspension composition, water, and optional additives) may be used to separate the drilling fluid from the cementitious fluid.

In embodiments, a method of servicing a wellbore penetrating a subterranean formation (e.g., offshore wellbore penetrating a subterranean formation) can further comprise placing a spacer fluid into at least a portion of the tubular space inside the casing; and displacing at least a portion of the cementitious fluid from the tubular space. For example, a spacer fluid of the type described herein can be pumped into the wellbore following release of a cement plug, and the spacer fluid can be used to push the cement plug through the casing, which in turn pushes the cementitious fluid out of the casing and into the annular space between the casing and the wellbore wall.

Figure 3:
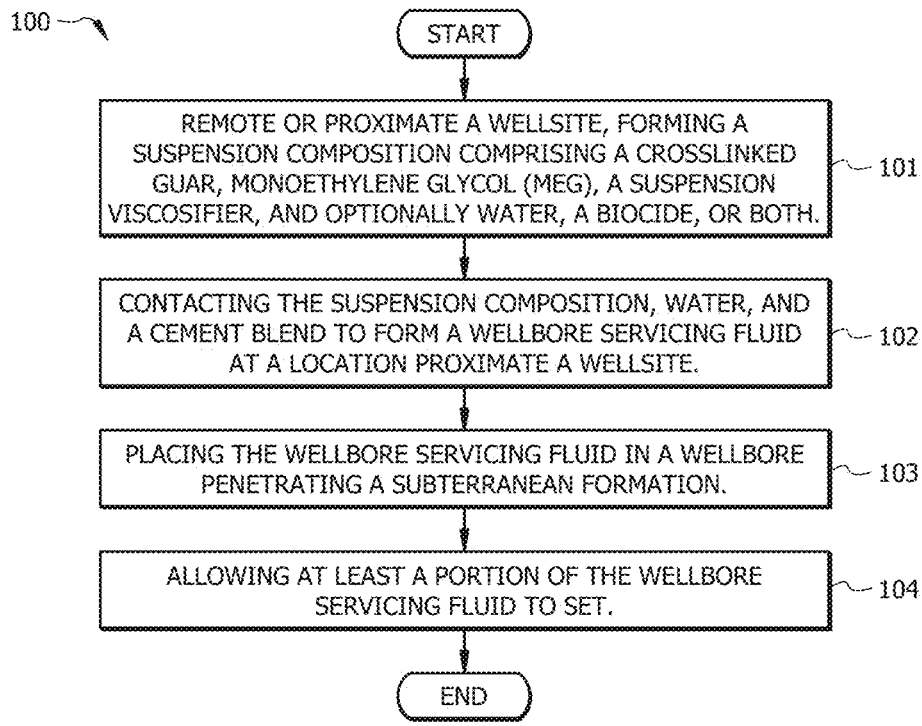
FIG. 3 is a flow chart of a method according to some embodiments of the disclosure.

FIG. 3 illustrates a method 100 in accordance with the present disclosure. Block 101 includes forming a suspension composition of the type disclosed herein, either at (e.g., proximate) a wellsite or remote from the wellsite and transported to the wellsite. The forming can comprise contacting a particulate material (e.g., a crosslinked guar), an organic carrier (e.g., MEG), a suspension viscosifier, and optionally water, a biocide, or both. Block 102 includes contacting the suspension composition, water, and a cement blend of the type disclosed herein to form a wellbore servicing fluid (e.g., cementitious fluid) at a location proximate a wellsite. The wellsite can be an offshore oil and gas platform and/or a floating vessel. Block 103 includes placing the wellbore servicing fluid in a wellbore penetrating a subterranean formation, for example as a primary or secondary cementing operation. The wellbore can be an offshore wellbore. Block 104 includes allowing at least a portion of the wellbore servicing fluid (e.g., cementitious fluid) to set. At least a portion of block 101, block 102, and block 103 can comprise a continuous process as disclosed herein.

Figure 4:
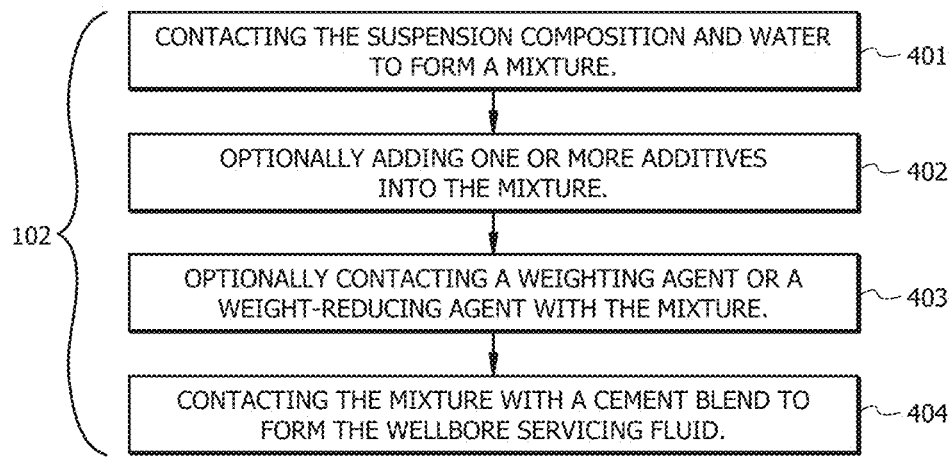
FIG. 4 is a flow chart of a method according to some embodiments of the disclosure.

Referring to FIG. 4, in embodiments, block 102 further comprises block 401, block 402, block 403, and block 404. Block 401 includes contacting the suspension composition and water to form a mixture. Block 402 is optional and includes adding one or more additives of the type disclosed herein into the mixture. Block 403 is optional and includes contacting a weighting agent or a weight-reducing agent with the mixture. Block 404 includes contacting the mixture with the cement blend to form a wellbore servicing fluid (e.g., cementitious fluid).

Figure 5:
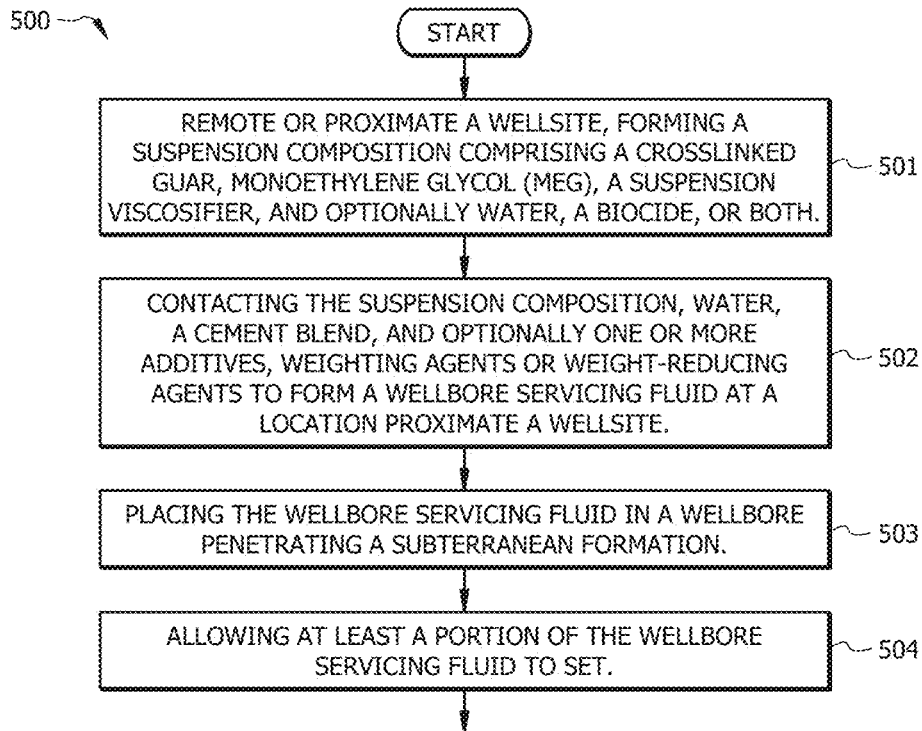
FIG. 5 is a flow chart of a method according to some embodiments of the disclosure.

FIG. 5 illustrates a method 500 in accordance with the present disclosure. Block 501 includes forming a suspension composition of the type disclosed herein, either at (e.g., proximate) a wellsite or remote from the wellsite and transported to the wellsite. The forming can comprise contacting a particulate material (e.g., a crosslinked guar), an organic carrier (e.g., MEG), a suspension viscosifier, and optionally water, a biocide, or both. Block 502 includes contacting the suspension composition, water, a cement blend of the type disclosed herein (e.g., a cement blend comprising a cementitious material), and optionally one or more additives and/or weighting agents or weight-reducing agents, to form a wellbore servicing fluid (e.g., cementitious fluid) at a location proximate a wellsite. The wellsite can be an offshore oil and gas platform and/or a floating vessel. Block 503 includes placing the wellbore servicing fluid in a wellbore penetrating a subterranean formation, for example as a primary or secondary cementing operation. The wellbore can be an offshore wellbore. Block 504 includes allowing at least a portion of the wellbore servicing fluid to set. At least a portion of block 501, block 502, and block 503 can comprise a continuous process as disclosed herein.

Figure 6:
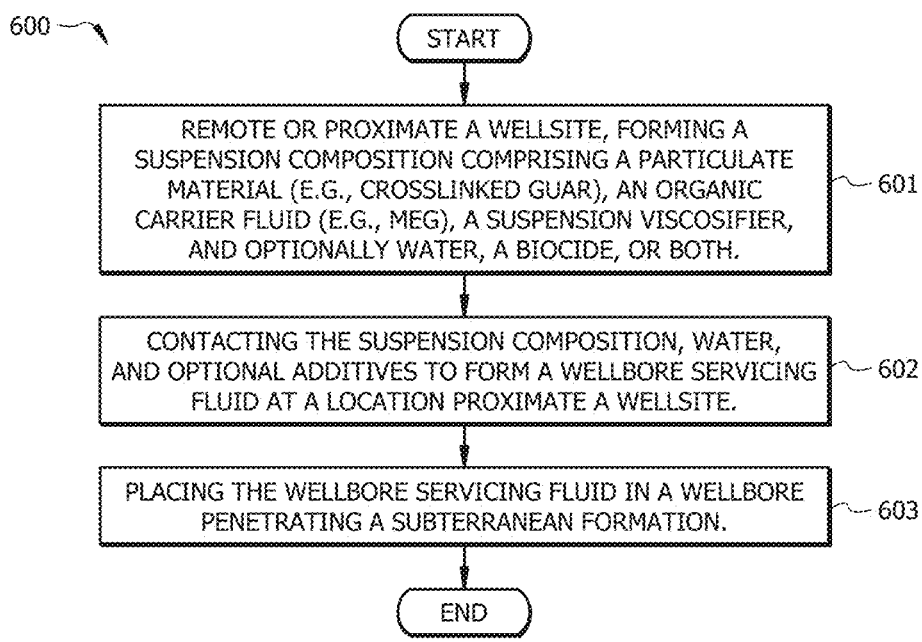
FIG. 6 is a flow chart of a method according to some embodiments of the disclosure.

FIG. 6 illustrates a method 600 in accordance with the present disclosure. Block 601 includes forming a suspension composition of the type disclosed herein, either at (e.g., proximate) a wellsite or remote from the wellsite and transported to the wellsite. The forming can comprise contacting a particulate material (e.g., a crosslinked guar), an organic carrier (e.g., MEG), a suspension viscosifier, and optionally water, a biocide, or both. Block 602 includes contacting the suspension composition, water, and optional additives of the type disclosed herein to form a wellbore servicing fluid (e.g., spacer fluid) at a location proximate a wellsite. The wellsite can be an offshore oil and gas platform and/or a floating vessel. Block 603 includes placing the wellbore servicing fluid in a wellbore penetrating a subterranean formation, for example to separate a drilling fluid from a cementitious fluid. The wellbore can be an offshore wellbore. At least a portion of block 601, block 602, and block 603 can comprise a continuous process as disclosed herein.

Figure 7:
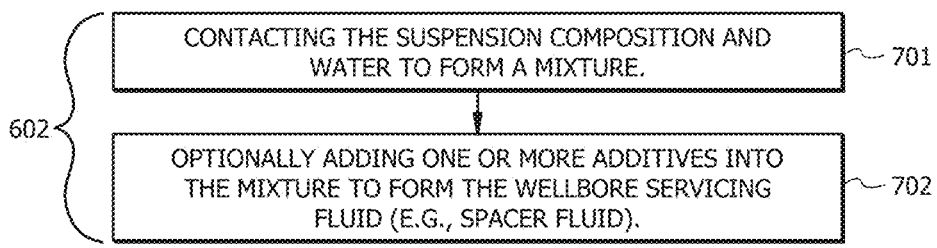
FIG. 7 is a flow chart of a method according to some embodiments of the disclosure.

Referring to FIG. 7, in embodiments, block 602 further comprises block 701 and block 702. Block 701 includes contacting the suspension composition and water to form a mixture. Block 702 is optional and includes adding one or more additives of the type disclosed herein into the mixture to form a wellbore servicing fluid (e.g., spacer fluid).

Figure 8:
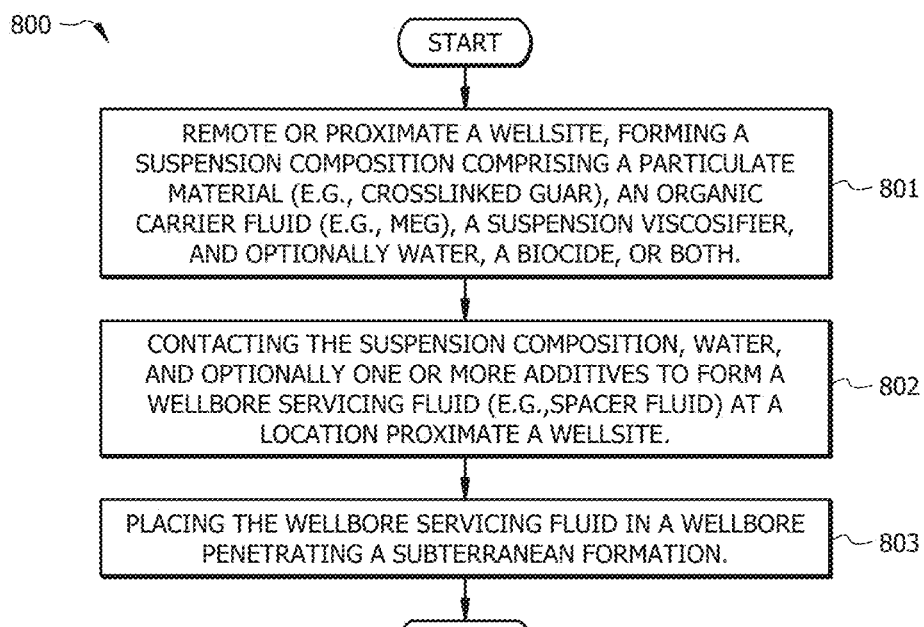
FIG. 8 is a flow chart of a method according to some embodiments of the disclosure.

FIG. 8 illustrates a method 800 in accordance with the present disclosure. Block 801 includes forming a suspension composition of the type disclosed herein, either at (e.g., proximate) a wellsite or remote from the wellsite and transported to the wellsite. The forming can comprise contacting a particulate material (e.g., a crosslinked guar), an organic carrier (e.g., MEG), a suspension viscosifier, and optionally water, a biocide, or both. Block 802 includes contacting the suspension composition, water, and optionally one or more additives to form a wellbore servicing fluid (e.g., spacer fluid) at a location proximate a wellsite. The wellsite can be an offshore oil and gas platform and/or a floating vessel. Block 803 includes placing the wellbore servicing fluid in a wellbore penetrating a subterranean formation, for example to separate a drilling fluid from a cementitious fluid. The wellbore can be an offshore wellbore. At least a portion of block 801, block 802, and block 803 can comprise a continuous process as disclosed herein.

Various benefits may be realized by utilization of the presently disclosed methods and compositions. For example, the wellbore servicing compositions (e.g., cementitious fluid; spacer fluid) of the present disclosure may exclude a biocide resulting in a reduced risk to organisms in surrounding environment. In addition, components of the wellbore servicing fluid disclosed herein have been deemed environment-friendly and on the PLONOR list, thus the wellbore servicing fluid can be used in offshore areas with relatively strict environmental protection regulations. Another advantage of the present disclosure is that the suspension composition used in the disclosed compositions and methods is easier to handle and allows improved accuracy with regard to metering an amount to add to a system, compared with a dry powder suspending agent. For example, some fluid preparation systems that cannot process a dry powder suspending agent due to limited equipment/tools (e.g., equipment/tools at an offshore platform) can process the suspension composition. Also, the suspension composition can be stable for more than 28 days which allows a sufficient time for transportation and storage.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

A formulation of a suspension composition of the type in the present disclosure for 1000 gram fluid is listed in Table 1 below. The suspension composition was prepared and used in Examples 1 and 2.

TABLE 1

Suspension Composition

| Component | Amount (g) |
|---|---|
| Crosslinked guar gum | 100.00 |
| Monoethylene glycol (MEG) | 898.80 |
| Suspension Viscosifier | 1.20 |

The suspension composition was firstly used in stability tests. The suspension composition was kept static in a standing 25 ml measuring cylinder to observe mixture stability.

After 21 days from preparation, density of the suspension composition was checked from top, middle and bottom portion of the suspension composition and shown in Table 2.

TABLE 2

Density across different portions

| Section | Density (lbm/gal) | Specific gravity (SG) |
|---|---|---|
| Top portion | 9.56 | 1.146 |
| Middle portion | 9.55 | 1.144 |
| Bottom portion | 9.56 | 1.146 |

Figure 9:
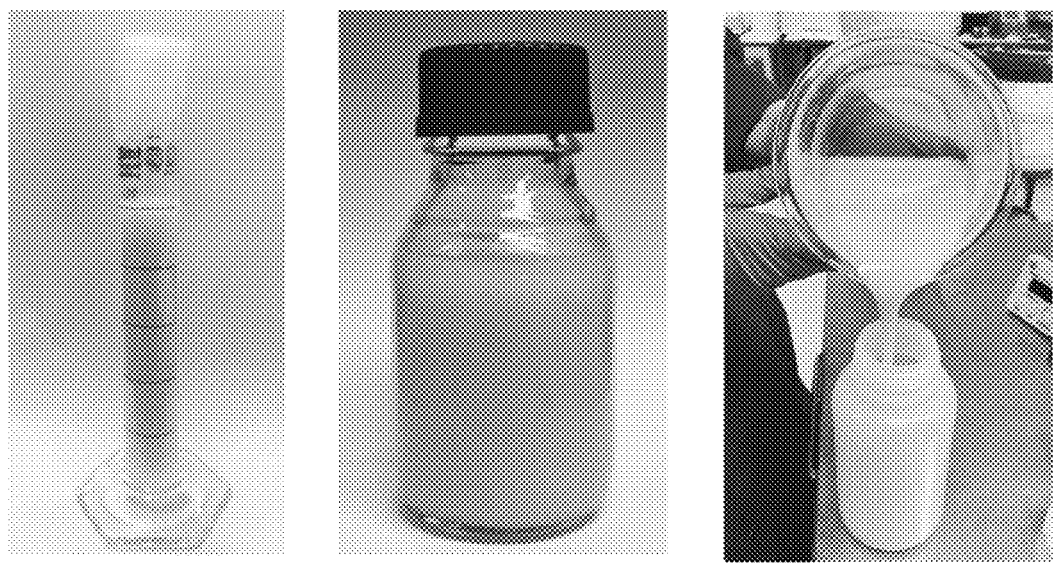
FIG. 9 is a photo of a stability test for the samples from Example 1.

As shown in FIG. 9, after 28 days from preparation, there was no visible separation of the suspension composition and the suspension composition was pourable. The results show that suspension composition was stable and uniformly dispersed throughout the suspension composition.

Physical properties were measured for the suspension composition and shown in Table 3 below.

TABLE 3

Physical properties

| Form | Liquid |
|---|---|
| Appearance | Yellow fluid |
| wt. % Solids | 10 |
| pH (1% suspension composition in water) | 7-8 |
| Brookfield viscosity (cP)* | 100-400 |
| SG | 1.145 |
| Density (lbm/gal) | 9.555 |

*B1, 75° F., 100 rpm

Example 2

Wellbore servicing fluids were prepared using a dry powder suspending agent or the suspension composition in Example 1. Test conditions and formulas of the wellbore servicing fluids are listed in Tables 4 and 5. The amounts of the cement blend composition are based on the total weight of the cement blend. The amount of the dry powder suspending agent is based on the total weight of the cement blend, while the dry powder suspending agent is not a part of the cement blend. Both of the wellbore servicing fluids had a density of 14.60 lbm/gal and a specific gravity of 1.75. The amount of the dry powder suspending agent in wellbore servicing fluid 1 (WSF1) was 1.3 g per 600 ml WSF1, which was equivalent to the amount of the crosslinked guar gum in wellbore servicing fluid 2 (WSF2).

TABLE 4

Test conditions

| Bottomhole circulating temperature (BHCT) | 129° F. |
|---|---|
| Bottomhole static temperature (BHST) | 168° F. |
| Heating Time | 60 min |
| Pressure | 5000 psi |

TABLE 5

Wellbore servicing fluids, 14.6 lbm/gal

| Description | Unit | WSF1 | WSF2 | Mixing procedure |
|---|---|---|---|---|
| Cement Blend Composition | | | | |
| Cementitious material | wt. % | 98.04 | 98.04 | PB |
| Expansion agent | wt. % | 1.96 | 1.96 | PB |
| Other Materials | | | | |
| Dry powder suspending agent | % BWOB | 0.20 | — | PH |
| Suspension composition | L/100 kg | — | 1.76 | PH |
| Defoamer | L/100 kg | 0.09 | 0.09 | PH |
| Retarder | L/100 kg | 1.00 | 1.00 | PH |
| Fluid loss control agent | L/100 kg | 7.70 | 7.70 | PH |
| Free fluid control additive | L/100 kg | 3.60 | 3.60 | PH |
| Water | L/100 kg | 48.67 | 47.30 | |

BWOB: By Weight of Cement Blend
PB: Pre-blend (added to the cementitious material as a part of the cement blend)
PH: Pre-hydrate (added to water before adding the cement blend)

Table 6 below shows 24 hr sonic compressive strength is lower in WSF2 compared to WSF1, however other properties are comparable.

TABLE 6

Performance comparison

| Performance Tests | WSF1 | WSF2 |
|---|---|---|
| Mixability rating (0-5), 0 is not mixable | 4 | 4 |
| Free Fluid, 45 degree inclination angle (%) | 0 | 0 |
| API Fluid loss (ml/30 min) | 44 | 38 |
| API Static Gel Strength (10 sec/10 min) | 1/9 | 2/16 |
| Thickening Time, 70 Bc (hh:mm) | 07:50 | 07:00 |
| 50 psi UCA Compressive Strength (hh:mm) | 10:15 | 10:26 |
| 500 psi UCA Compressive Strength (hh:mm) | 13:40 | 15:05 |
| 24 hr UCA Compressive Strength (psig) | 1253 | 956 |

Table 7 shows that the rheology data measured by a Fann® Model 35 viscometer for WSF 1 and WSF 2 are comparable.

TABLE 7

FANN ® 35 Rheology Data

| | 68° F. | | 129° F. | | 190° F. | |
|---|---|---|---|---|---|---|
| RPM | WSF1 | WSF2 | WSF1 | WSF2 | WSF1 | WSF2 |
| 3 | 1 | 1 | 2 | 3 | 4 | 5 |
| 6 | 2 | 2 | 3 | 5 | 5 | 7 |
| 30 | 8 | 7 | 11 | 14 | 16 | 22 |
| 60 | 13 | 13 | 19 | 23 | 26 | 35 |

TABLE 7-continued

FANN® 35 Rheology Data

| | 68° F. | | 129° F. | | 190° F. | |
|---|---|---|---|---|---|---|
| RPM | WSF1 | WSF2 | WSF1 | WSF2 | WSF1 | WSF2 |
| 100 | 21 | 21 | 28 | 33 | 36 | 48 |
| 200 | 38 | 39 | 48 | 55 | 60 | 76 |
| 300 | 53 | 55 | 66 | 75 | 80 | 102 |

Further, WSF1 and WSF2 were cured at 168° F./5,000 psig for 7 days and then tested for mechanical properties. The results are in Table 8 below.

TABLE 8

Mechanical properties

| Tests | WSF1 | WSF2 |
|---|---|---|
| Crush Compressive Strength (psig) | 3582 | 3926 |
| Std. Dev. (psig) | 76 | 43 |
| Young's Modulus (Mpsig) | 0.890 | 0.954 |
| Std. Dev. (Mpsig) | 0.014 | 0.015 |
| Brazilian Tensile Strength (psig) | 464 | 472 |
| Std. Dev. (psig) | 13 | 54 |

The experiments demonstrate the following. 7 days curing data shows there was no adverse effect of the use of the suspension composition on mechanical properties of set cement. UCA Compressive Strength shows a slight delay in strength development for WSF2. Regarding to other slurry properties such as mixability, free fluid, rheology, gel strength, and fluid loss, there was no adverse effect of the use of the suspension composition by comparing WSF1 and WSF2.

Example 3

A formulation of a suspension composition for 1235 gram fluid is listed in Table 9 below, and the suspension composition was prepared and used in Examples 3 and 4.

The preparation procedures included: taking a 2-liter clean acrylic wearing blender, adding 1 liter of monoethylene glycol into the blender, starting mixing at 1000 rpm and adding 1.5 g of suspension viscosifier, continuing stirring for 10 minutes to get a clear solution, adding 123.5 g of crosslinked guar gum under stirring and continuing mixing at 1500 rpm for 15 min. and storing the produced suspension composition in a closed container.

TABLE 9

Suspension Composition

| Component | gm | ml |
|---|---|---|
| Crosslinked guar gum | 123.50 | 80.72 |
| Monoethylene glycol (MEG) | 1110.00 | 1000.00 |
| Suspension Viscosifier | 1.50 | 1.02 |

Physical properties were measured for the suspension composition and shown in Table 10 below.

TABLE 10

Physical properties

| Form | Liquid |
|---|---|
| Appearance | Yellow fluid |
| Odor | Smells like the crosslinked guar gum, no specific solvent odor |
| wt. % Solids | 10-50 |
| Solubility in water | Miscible |
| pH (1% suspension composition in water) | 7-8 |
| Brookfield viscosity (B1, 75° F., 100 rpm) (cP) | 100-600 |
| SG | 1.1-1.3 |
| Density (lbm/gal) | 9-11 |
| Flash Point | >230° F. (110° C.) |
| Freezing point | About 10° F. (−12° C.) |
| Boiling point | About 387° F. (197° C.) |

Example 4

Wellbore servicing fluids were prepared using a dry powder suspending agent or the suspension composition in Example 3. Formulas of the wellbore servicing fluids are listed in Table 11. The amounts of the cement blend composition are based on the total weight of the cement blend. The amounts of the weighting agent and the dry powder suspending agent are based on the total weight of the cement blend while the weighting agent and the dry powder suspending agent are not a part of the cement blend. Both of the wellbore servicing fluids have a density of 17.53 lbm/gal and a specific gravity of 2.1. The amount of the dry powder suspending agent in wellbore servicing fluid 3 (WSF3) is equivalent to the amount of the crosslinked guar gum in wellbore servicing fluid 4 (WSF4).

TABLE 11

Wellbore servicing fluids, 17.53 lbm/gal

| Description | Unit | WSF3 | WSF4 | Mixing procedure |
|---|---|---|---|---|
| Cement Blend Composition | | | | |
| Cementitious material | wt. % | 72.42 | 72.42 | PB |
| Quartz flour | wt. % | 25.34 | 25.34 | PB |
| Bulk flow enhancer | wt. % | 0.07 | 0.07 | PB |
| Expansion agent | wt. % | 2.17 | 2.17 | PB |
| Other Materials | | | | |
| Weighting agent | % BWOB | 20.00 | 20.00 | PH |
| Dry powder suspending agent | % BWOB | 0.20 | — | PH |
| Suspension composition | L/100 kg | — | 1.76 | PH |
| Defoamer | L/100 kg | 0.10 | 0.10 | PH |
| Retarder | L/100 kg | 4.00 | 4.00 | PH |
| Fluid loss control agent | L/100 kg | 4.50 | 4.50 | PH |
| Cement dispersant | L/100 kg | 4.00 | 4.00 | PH |
| Microsilica liquid | L/100 kg | 8.00 | 8.00 | PH |
| water | L/100 kg | 21.26 | 19.80 | PH |

BWOB: By Weight of Cement Blend
PB: Pre-blend (added to the cement material as a part of the cement blend)
PH: Pre-hydrate (added to water before adding the cement blend)

WSF3 and WSF4 were cured at 212° F./5000 psi for 7 days and then tested for mechanical properties. The results in Table 12 below show there was no adverse effect of the use of the suspension composition on mechanical properties of set cement.

TABLE 12

Mechanical properties

| Tests | WSF3 | WSF4 |
|---|---|---|
| Crush Compressive Strength (psig) | 5183 | 5446 |
| Young's Modulus (Mpsig) | 1.454 | 1.383 |
| Brazilian Tensile Strength (psig) | 650 | 633 |

Example 5

A formulation of a suspension composition of comprising clay as the particulate material was prepared as follows. Clay suspension #1 contained 36 w-t. % bentonite, 63.98 wt. % MEG, and 0.02 wt. % diutan, based on the total weight of the clay suspension. Clay suspension #2 contained 36 wt. % bentonite, 63.96 wt. % MEG, and 0.04 wt. % diutan, based on the total weight of the clay suspension. Clay suspension #1 was prepared by taking a 2-liter clean acrylic wearing blender, adding 1 liter of monoethylene glycol into the blender, starting mixing at 1,000 rpm and adding 0.37 g of diutan, continuing stirring for 10 minutes to get a clear solution, adding 627 g of bentonite under stirring, and continuing mixing at 1,000 rpm for 10 min, followed by storing the produced suspension composition in a closed container. Clay suspension #2 was prepared by taking a 2-liter clean acrylic wearing blender, adding 1 liter of monoethylene glycol into the blender, starting mixing at 1,000 rpm and adding 0.74 g of diutan, continuing stirring for 10 minutes to get a clear solution, adding 627 g of bentonite under stirring, and continuing mixing at 1000 rpm for 10 min, followed by storing the produced suspension composition in a closed container.

Rheology data were measured by a Fann® Model 35 viscometer for the clay suspensions #1 and #2, 10 weeks after preparing the suspensions, and the data are displayed in Tables 13 and 14, respectively.

TABLE 13

| 3 rpm | 6 rpm | 30 rpm | 60 rpm | 100 rpm | 200 rpm | 300 rpm |
|---|---|---|---|---|---|---|
| 15 | 21 | 59 | 101 | 153 | 269 | >300 |

TABLE 14

| 3 rpm | 6 rpm | 30 rpm | 60 rpm | 100 rpm | 200 rpm | 300 rpm |
|---|---|---|---|---|---|---|
| 28 | 39 | 98 | 154 | 224 | >300 | >300 |

After 10 weeks from preparation, there was no visible separation of the suspension compositions and the suspension compositions remained pourable. The data in Tables 13 and 14 show that the suspension compositions were stable and the bentonite was uniformly dispersed throughout the suspension composition. These clay-based suspension composition can be used for suspending particles in a cement slurry (e.g., cementitious fluid).

Example 6

A formulation of a suspension composition as disclosed herein was prepared as follows. The suspension composition contained 20 wt. % clay (e.g., a specially formulated clay which imparts thixotropic properties to a cement slurry, such as a cementitious fluid) and 80 wt. % MEG, based on the total weight of the suspension composition. The suspension composition was prepared by taking a 2-liter clean acrylic wearing blender, adding 1 liter of monoethylene glycol into the blender, starting mixing at 1,000 rpm and adding 280 g of clay, and continuing stirring for 5 minutes, followed by storing the produced suspension composition in a closed container.

Rheology data were measured by a Brookfield viscometer for the suspension composition, and the viscosity was 370 cP when measured after 2 days at 22° C., 100 rpm/170 l/s.

After preparation, there was no visible separation of the suspension composition and the suspension composition was pourable. The results show that suspension composition was stable and the clay was uniformly dispersed throughout the suspension composition. This clay-based suspension composition can be used for suspending particles in a cement slurry (e.g., cementitious fluid).

Example 7

A formulation of a suspension composition of comprising magnesium oxide as the particulate material was prepared as follows. The composition of the suspension compositions, along with the rheology data are displayed in Table 15. Compositions S #1 and S #2 in Table 15 do not contain magnesium oxide and are used as controls (e.g., baseline points). The suspension compositions were prepared by taking a 0.5-liter clean glass blender, adding 4 times the mass fraction (in grams) of monoethylene glycol into the blender, starting mixing at 1,000 rpm and adding the corresponding amount of diutan (per Table 15), continuing stirring for 10 minutes to get a clear solution, adding magnesium oxide under stirring, and continuing mixing at 1.000 rpm for 10 min. followed by storing the produced suspension composition in a closed container.

TABLE 15

| | Ethylene Glycol (mf) | Diutan (mf) | Magnesium Oxide (mf) | Free Fluid (24 h) | Free Fluid (21 d) | Bob Deflection (Degrees) at rotor speed | | | | | | |
|---|---|---|---|---|---|---|---|---|---|---|---|---|
| | | | | | | 300 rpm | 200 rpm | 100 rpm | 60 rpm | 30 rpm | 6 rpm | 3 rpm |
| S#1 | 100.00% | 0.00% | 0.00% | | | 19.2 | 12.4 | 6.5 | 3.7 | 1.2 | | |
| S#2 | 99.96% | 0.04% | 0.00% | | | 30.8 | 23.1 | 13.0 | 8.4 | 5.1 | 1.0 | 0.6 |
| S#3 | 43.46% | 0.05% | 56.49% | 1.00% | 1.00% | | | 277.6 | 180.1 | 219.7 | 82.1 | 59.4 |
| S#4 | 49.98% | 0.05% | 49.98% | 10.00% | 20.00% | | | 277.6 | 180.1 | 99.7 | 29.0 | 20.8 |
| S#5 | 54.98% | 0.05% | 44.97% | 15.00% | 25.00% | 270.6 | 190.9 | 99.8 | 62.6 | 34.3 | 10.9 | 7.7 |
| S#6 | 54.96% | 0.09% | 44.95% | 10.00% | 20.00% | | | 259.1 | 170.4 | 100.7 | 33.3 | 22.3 |
| S#7 | 59.94% | 0.02% | 40.04% | | | 162.5 | 111.2 | 51.9 | 31.9 | 16.7 | 4.7 | 2.7 | mf = mass fraction

The data in Table 15 indicate that the free fluid increases as the yield point decreases but more importantly, there are no solids settling out. The very high rheologies (such as for composition S #3) also develop very strong static gels. Without being limited by theory, it appears that the majority of the free fluid is due to varying amounts of syneresis. The data in Table 15 indicate that one can modify the rheological properties of the fluid via adjustment of the suspending aid to prevent sedimentation. Further, and without being limited by theory, the suspension composition is viscoelastic.

ADDITIONAL DISCLOSURE

Embodiment A: A method comprising contacting a suspension composition, water, and a cement blend to form a wellbore servicing fluid at a location proximate a wellsite, wherein the suspension composition comprises a crosslinked guar, monoethylene glycol (MEG), and a suspension viscosifier; placing the wellbore servicing fluid in a wellbore penetrating a subterranean formation; and allowing the wellbore servicing fluid to set.

Embodiment B: The method of Embodiment A, wherein the wellsite comprises an offshore platform, a floating vessel, or combinations thereof; and wherein the wellbore is offshore.

Embodiment C: The method of any one of Embodiments A and B, wherein the contacting comprises contacting the suspension composition with water to form a mixture; and contacting the mixture with the cement blend to form the wellbore servicing fluid.

Embodiment D: The method of Embodiment C, wherein contacting the suspension composition with water comprises conveying the suspension composition via a suspension flow line into the water in a water flow line to form the mixture.

Embodiment E: The method of any one of Embodiments A through D, further comprising adding one or more additives to the wellbore servicing fluid prior to placing the wellbore servicing fluid in the wellbore.

Embodiment F: The method of Embodiment E, wherein the one or more additives are added to the mixture prior to contacting the mixture with the cement blend.

Embodiment G: The method of any one of Embodiments E and F, wherein adding one or more additives to the mixture comprises conveying the one or more additives via one or more additive flow lines into the mixture in a mixture flow line.

Embodiment H: The method of any one of Embodiments A through G, further comprising adding a weighting agent or a weight-reducing agent to the wellbore servicing fluid prior to placing the wellbore servicing fluid in the wellbore.

Embodiment I: The method of Embodiment H, wherein the weighting agent or the weight-reducing agent is added to the mixture prior to or concurrent with contacting the mixture with the cement blend.

Embodiment J: The method of any one of Embodiments A through I, wherein at least a portion of contacting the suspension composition, water, and the cement blend comprises a continuous process.

Embodiment K: The method of any one of Embodiments A through J, wherein the crosslinked guar is present in the suspension composition in an amount of from about 1 wt. % to about 50 wt. %, based on a total weight of the suspension composition.

Embodiment L: The method of any one of Embodiments A through K, wherein the MEG is present in the suspension composition in an amount of from about 49 wt. % to about 98.99 wt. %, based on a total weight of the suspension composition.

Embodiment M: The method of any one of Embodiments A through L, wherein the suspension viscosifier comprises Guar gum, Xanthan gum, Welan gum, Diutan, hydroxyethyl cellulose (HEC), modified cellulose and derivatives thereof, diatomaceous earth, starch, modified and/or crosslinked starch, viscoelastic surfactants (VES), precipitated silica, or combinations thereof.

Embodiment N: The method of any one of Embodiments A through M, wherein the suspension viscosifier is present in the suspension composition in an amount of from about 0.01 wt. % to about 20 wt. %, based on a total weight of the suspension composition.

Embodiment O: The method of any one of Embodiments A through N, wherein the suspension composition further comprises water, a biocide, or combinations thereof.

Embodiment P: The method of Embodiment O, wherein the water is selected from a group consisting of freshwater, saltwater, brine, seawater, and combinations thereof.

Embodiment Q: The method of any one of Embodiments O and P, wherein the water is present in the suspension composition in an amount of from about 0 wt. % to about 30 wt. %, based on a total weight of the suspension composition.

Embodiment R: The method of any one of Embodiments O through Q, wherein the biocide comprises 3,3'-methylenebis[5-methyloxazolidine].

Embodiment S: The method of any one of Embodiments O through R, wherein the biocide is present in the suspension composition in an amount of from about 0 wt. % to about 1 wt. %, based on a total weight of the suspension composition.

Embodiment T: The method of any one of Embodiments A through S, wherein the suspension composition is present in the wellbore servicing fluid in an amount of from about 0.1 wt. % to about 20 wt. %, based on a total weight of the wellbore servicing fluid.

Embodiment U: The method of any one of Embodiments A through T, wherein the suspension composition has a density of from about 9 pounds per gallon (ppg) to about 12 ppg.

Embodiment V: The method of any one of Embodiments A through U, wherein the suspension composition has a specific gravity of from about 1.1 to about 1.4.

Embodiment W: The method of any one of Embodiments A through V, wherein the suspension composition has a pH in a range of from about 4 to about 12, when measured for 1 vol. % dilution of the suspension composition in water.

Embodiment X: The method of any one of Embodiments A through W, wherein the suspension composition has a Brookfield viscosity of from about 50 cP to about 600 cP at 75° F. and 100 rpm.

Embodiment Y: The method of any one of Embodiments A through X, wherein the suspension composition has a flash point of equal to or greater than about 230° F.

Embodiment Z: The method of any one of Embodiments A through Y, wherein the suspension composition has a freezing point of from about 8° F. to about 24° F.

Embodiment AA: The method of any one of Embodiments A through Z, wherein the suspension composition has a boiling point of from about 210° F. to about 410° F.

Embodiment BB: The method of any one of Embodiments A through AA, wherein the cement blend comprises a cementitious material.

Embodiment CC: The method of Embodiment BB, wherein the cementitious material comprises Portland cement, pozzolana cement, gypsum cement, shale cement, acid cement, base cement, phosphate cement, high alumina content cement, slag cement, silica cement, high alkalinity cement, magnesia cement, lime, or combinations thereof.

Embodiment DD: The method of any one of Embodiments BB and CC, wherein the cementitious material is present in the cement blend in an amount of from about 1% BWOB (by weight of blend) to about 100% BWOB, based on a total weight of the cement blend.

Embodiment EE: The method of any one of Embodiments BB through DD, wherein the cement blend further comprises an expansion agent.

Embodiment FF: The method of Embodiment EE, wherein the expansion agent comprises metal powders, aluminum powder, a gypsum blend, alkali metal oxides, alkaline earth metal oxides, magnesium oxide, deadburned magnesium oxide, lightly burned magnesium oxide, hard burned magnesium oxide, or combinations thereof.

Embodiment GG: The method of any one of Embodiments EE and FF, wherein the expansion agent is present in the cement blend in an amount of from about 1% BWOB to about 10% BWOB, based on a total weight of the cement blend.

Embodiment HH: The method of any one of Embodiments EE through GG, wherein the method further comprises dry mixing the cementitious material and the expansion agent to form the cement blend prior to contacting the cement blend with the water and the suspension composition.

Embodiment II: The method of any one of Embodiments BB through HH, wherein the cement blend further comprises one or more cement blend additives.

Embodiment JJ: The method of Embodiment II, wherein the one or more cement blend additives comprise quartz flour, bulk flow enhancer, amorphous silica, siliceous material, fly ash, or combinations thereof.

Embodiment KK: The method of any one of Embodiments II and JJ, wherein the one or more cement blend additives are present in the cement blend in an amount of from about 5% BWOB to about 95% BWOB, based on a total weight of the cement blend.

Embodiment LL: The method of any one of Embodiments II through KK, wherein the method further comprises dry mixing the cementitious material and the one or more cement blend additives to form the cement blend prior to contacting the cement blend with the water and the suspension composition.

Embodiment MM: The method of any one of Embodiments A through LL, wherein the cement blend is present in the wellbore servicing fluid in an amount ranging from about 20 wt. % to about 90 wt. %, based on a total weight of the wellbore servicing fluid.

Embodiment NN: The method of any one of Embodiments H1 through MM, wherein the weighting agent or the weight-reducing agent is present in the wellbore servicing fluid in an amount of from about 1% BWOB to about 200% BWOB, based on a total weight of the cement blend.

Embodiment OO: The method of any one of Embodiments E through NN, wherein the one or more additives comprise a defoamer, a cement retarder, a cement dispersant, a fluid loss control additive, a fume silica, a free fluid control additive, a viscosifying agent, an acid, a base, an emulsifier, a salt, a corrosion inhibitor, a mutual solvent, a conventional breaking agent, a relative permeability modifier, lime, a gelling agent, a crosslinker, a flocculant, a water softener, a proppant, an oxidation inhibitor, a thinner, a scavenger, a gas scavenger, a lubricant, a friction reducer, a bridging agent, a vitrified shale, a thixotropic agent, a surfactant, a scale inhibitor, a clay, a clay control agent, a clay stabilizer, a silicate-control agent, a biostatic agent, a storage stabilizer, a filtration control additive, a foaming agent, a foam stabilizer, latex emulsions, a formation conditioning agent, elastomers, gas/fluid absorbing materials, resins, superabsorbers, mechanical property modifying additives, inert particulates, and the like, or combinations thereof.

Embodiment PP: The method of any one of Embodiments E through OO, wherein the one or more additives are present in the wellbore servicing fluid in a total amount of from about 0.1 L/100 kg to about 50 L/100 kg, based on a total weight of the cement blend.

Embodiment QQ: The method of any one of Embodiments E through PP, wherein the one or more additives are present in the wellbore servicing fluid in a total amount of from about 0.05% BWOB to about 100% BWOB, based on a total weight of the cement blend.

Embodiment RR: The method of any one of Embodiments A through QQ, wherein the water is selected from a group consisting of freshwater, saltwater, brine, seawater, and combinations thereof.

Embodiment SS: The method of any one of Embodiments A through RR, wherein the water is present in the wellbore servicing fluid in an amount of from about 10 L/100 kg to about 400 L/100 kg, based on a total weight of the cement blend.

Embodiment TT: The method of any one of Embodiments A through SS, wherein components of the wellbore servicing fluid are PLONOR (Pose Little or No Risk to the Environment) materials.

Embodiment UU: The method of any one of Embodiments A through TT, wherein the wellbore servicing fluid has a density of from about 9 pounds per gallon (ppg) to about 26 ppg.

Embodiment VV: The method of any one of Embodiments A through UU, wherein the wellbore servicing fluid has a specific gravity of from about 1.1 to about 2.5.

Embodiment WW: The method of any one of Embodiments A through VV, wherein the wellbore servicing fluid has a mixability rating of from about 3 to about 5.

Embodiment XX: The method of any one of Embodiments A through WW, wherein the wellbore servicing fluid has a fluid loss of from about 10 ml per 30 minutes to about 250 ml per 30 minutes on 325 mesh screen at about 129° F. and about 1,000 psig differential pressure, when measured in accordance with a test standard API-RP-10B-2.

Embodiment YY: The method of any one of Embodiments A through XX, wherein the wellbore servicing fluid has a 10-second static gel strength of from about 1 to about 50, and a 10-minute static gel strength of from about 1 to about 300, at about 129° F., when measured in accordance with a test standard API-RP-10B-2.

Embodiment ZZ: The method of any one of Embodiments A through YY, wherein the wellbore servicing fluid has a thickening time of from about 3 hours to about 24 hours at about 129° F. and about 5,000 psig, when measured in accordance with a test standard API-RP-10B-2.

Embodiment AAA: The method of any one of Embodiments A through ZZ, wherein the wellbore servicing fluid has a 50 psi UCA compressive strength of from about 1 hour to about 48 hours, a 500 psi UCA compressive strength of from about 2 hours to about 72 hours, and a 24 hr UCA compressive strength of from about 50 psig to about 10.000 psig, when measured at about 168° F. and about 5.000 psi in accordance with a test standard API-RP-10B-2.

Embodiment BBB: The method of any one of Embodiments A through AAA, wherein the wellbore has a Bottomhole Circulation Temperature (BHCT) of from about 70° F. to about 400° F.

Embodiment CCC: The method of any one of Embodiments A through BBB, wherein the wellbore has a Bottomhole Static Temperature (BHST) of from about 100° F. to about 400° F.

Embodiment DDD: The method of any one of Embodiments A through CCC, wherein a cement cured from the wellbore servicing fluid has a crush compressive strength of from about 500 psig to about 12,000 psig.

Embodiment EEE: The method of any one of Embodiments A through DDD, wherein a cement cured from the wellbore servicing fluid has a Young's Modulus of from about 0.3 Mpsig to about 3 Mpsig.

Embodiment FFF: The method of any one of Embodiments A through EEE, wherein a cement cured from the wellbore servicing fluid has a Brazilian Tensile Strength of from about 50 psig to about 1.600 psig.

Embodiment GGG: A method comprising forming a suspension composition comprising a crosslinked guar, monoethylene glycol (MEG), and a suspension viscosifier; contacting the suspension composition, water, a cement blend comprising a cementitious material, and optionally one or more additives, weighting agents or weight-reducing agents to form a wellbore servicing fluid at a location proximate a wellsite; placing the wellbore servicing fluid in a wellbore penetrating a subterranean formation; and allowing the wellbore servicing fluid to set.

Embodiment HHH: A method comprising forming a suspension composition comprising a crosslinked guar, monoethylene glycol (MEG), a suspension viscosifier, and optionally water, a biocide, or both; contacting the suspension composition with water to form a mixture at a location proximate a wellsite; contacting the mixture with a cement blend and optionally one or more additives, weighting agents or weight-reducing agents to form a wellbore servicing fluid; placing the wellbore servicing fluid in a wellbore penetrating a subterranean formation; and allowing the wellbore servicing fluid to set.

Embodiment III: A method comprising forming a suspension composition comprising a crosslinked guar, monoethylene glycol (MEG), a suspension viscosifier, and brine; contacting the suspension composition with water to form a mixture at a location proximate a wellsite; contacting the mixture with a cement blend and optionally one or more additives, weighting agents or weight-reducing agents to form a wellbore servicing fluid; placing the wellbore servicing fluid in a wellbore penetrating a subterranean formation; and allowing the wellbore servicing fluid to set.

Embodiment JJJ: The method of any one of Embodiments A through Ill, wherein the method further comprises adding a gas to the wellbore servicing fluid, prior to placing the wellbore servicing fluid in a wellbore penetrating a subterranean formation.

Embodiment KKK: The method of Embodiment JJJ, wherein a target density of the wellbore servicing fluid is from about 5 pounds per gallon (ppg) to about 16 ppg.

Embodiment LLL: The method of any one of Embodiments JJJ and KKK, wherein the gas is present in the wellbore servicing fluid placed in the wellbore in an amount of from about 10 vol. % to about 30 vol. %, based on a total volume of the wellbore servicing fluid placed in the wellbore.

Embodiment MMM: The method of any one of Embodiments JJJ through LLL, wherein the gas comprises nitrogen.

Embodiment NNN: A method comprising (a) contacting a crosslinked guar, monoethylene glycol (MEG), and a suspension viscosifier to form a suspension composition; (b) conveying the suspension composition via a suspension flow line into water in a water flow line at a location proximate an offshore platform to form a diluted suspension; (c) conveying one or more additives via one or more additive flow lines into the diluted suspension in a diluted suspension line to form a mixture; (d) placing the mixture in a container; (e) adding a cement blend and optionally a weighting agent or a weight-reducing agent into the container to form a slurry; (f) blending the slurry to form a wellbore servicing fluid; (g) placing the wellbore servicing fluid in an offshore wellbore penetrating a subterranean formation; and (h) allowing the wellbore servicing fluid to set.

Embodiment OOO: A suspension composition comprising a crosslinked guar, monoethylene glycol (MEG), and a suspension viscosifier.

Embodiment PPP: The suspension composition of Embodiment OOO further comprising water, a biocide, or combinations thereof.

Embodiment QQQ: A wellbore servicing composition comprising the suspension composition of any one of Embodiments OOO and PPP, water, a cement blend, and optionally one or more additives, weighting agents or weight-reducing agents.

Embodiment A1: A method comprising (a) contacting a suspension composition, water, and optionally one or more additives to form a wellbore servicing fluid at a location proximate a wellsite; wherein the suspension composition comprises a particulate material, an organic carrier fluid, and a suspension viscosifier; and (b) placing the wellbore servicing fluid in a wellbore penetrating a subterranean formation.

Embodiment B1: The method of Embodiment A1, wherein the wellsite comprises an offshore platform, a floating vessel, or combinations thereof; and wherein the wellbore is offshore.

Embodiment C1: The method of any one of Embodiments A1 and B1, wherein the particulate material comprises a water-interactive material and/or a water-insoluble material; wherein the water-interactive material comprises an expansion agent, alkali metal oxides, alkaline earth metal oxides, magnesium oxide, lightly burned magnesium oxide, hard burned magnesium oxide, deadburned magnesium oxide, metal powders, aluminum powder, a gypsum blend; a viscosifying clay, bentonite, sepiolite, hectorite; a delayed viscosifier, crosslinked guar, crosslinked vinyl alcohols, crosslinked acrylamide polymers; a fluid loss agent, an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethyl-acrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N-N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof; or combinations thereof; and wherein the water-insoluble material comprises pozzolana cement; sand; a weighting agent, an iron oxide, hematite, a manganese oxide, hausmannite, a titanium-iron oxide, ilmenite; a fiber, a carbon fiber, an acrylonitrile fiber, a polypropylene fiber, a glass fiber, a rubber fiber; a rubber particle; a hollow glass sphere; a hollow pozzolanic sphere; a glass bubble; a glass ball; a ceramic ball; graphite; pozzolan; pumice; trass; clay; calcined clay; silica, fume silica, amorphous silica, micro-sized silica, nano-sized silica; or combinations thereof.

Embodiment D1: The method of any one of Embodiments A1 through C1, wherein the particulate material is present in the suspension composition in an amount of from about 1 wt. % to about 80 wt. %, based on a total weight of the suspension composition.

Embodiment E1: The method of any one of Embodiments A1 through D1, wherein the organic carrier fluid comprises a glycol and/or a glycol ether; wherein the glycol comprises monoethylene glycol, propylene glycol, butylene glycol, or combinations thereof; and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or combinations thereof.

Embodiment F1: The method of any one of Embodiments A1 through E1, wherein the organic carrier fluid is present in the suspension composition in an amount of from about 20 wt. % to about 98.99 wt. %, based on a total weight of the suspension composition.

Embodiment G1: The method of any one of Embodiments A1 through F1, wherein the suspension viscosifier comprises Guar gum, Xanthan gum, Welan gum, Diutan, hydroxyethyl cellulose (HEC), diatomaceous earth, starch, modified and/or crosslinked starch, modified cellulose, viscoelastic surfactants (VES), precipitated silica, derivatives thereof, or combinations thereof.

Embodiment H1: The method of any one of Embodiments A1 through G1, wherein the suspension viscosifier is present in the suspension composition in an amount of from about 0.01 wt. % to about 20 wt. %, based on a total weight of the suspension composition.

Embodiment I1: The method of any one of Embodiments A1 through H1, wherein the suspension composition is present in the wellbore servicing fluid in an amount of from about 0.1 wt. % to about 60 wt. %, based on a total weight of the wellbore servicing fluid.

Embodiment J1: The method of any one of Embodiments A1 through I1, wherein the suspension composition has (A1) a density of from about 4 pounds per gallon (ppg) to about 25 ppg; (A2) a specific gravity of from about 0.5 to about 3; (A3) a pH in a range of from about 4 to about 12, when measured for 1 vol. % dilution of the suspension composition in water; (A4) a Brookfield viscosity of from about 50 cP to about 600 cP at 75° F. and 100 rpm; (A5) a flash point of equal to or greater than about 230° F.; (A6) a freezing point of from about 8° F. to about 24° F.; (A7) a boiling point of from about 210° F. to about 410° F.; or (A8) any combination of (A1)-(A7).

Embodiment K1: The method of any one of Embodiments A1 through J1, wherein the wellbore servicing fluid is a cementitious fluid; wherein the contacting comprises (i) contacting the suspension composition with water to form a mixture, and (ii) contacting the mixture with a cement blend to form the wellbore servicing fluid; wherein the one or more additives are optionally added to the mixture prior to contacting the mixture with the cement blend; and wherein the wellbore servicing fluid is allowed to set.

Embodiment L1: The method of Embodiment K1 further comprising adding a weighting agent or a weight-reducing agent to the wellbore servicing fluid prior to placing the wellbore servicing fluid in the wellbore; wherein the weighting agent or the weight-reducing agent is added to the mixture prior to or concurrent with contacting the mixture with the cement blend.

Embodiment M1: The method of any one of Embodiments K1 and L1 further comprising adding a weighting agent or a weight-reducing agent to the wellbore servicing fluid prior to placing the wellbore servicing fluid in the wellbore; wherein the weighting agent or the weight-reducing agent is added to the mixture prior to or concurrent with contacting the mixture with the cement blend.

Embodiment N1: The method of any one of Embodiments K1 through M1, wherein the cement blend is present in the wellbore servicing fluid in an amount ranging from about 20 wt. % to about 90 wt. %, based on a total weight of the wellbore servicing fluid; and wherein the weighting agent or the weight-reducing agent is present in the wellbore servicing fluid in an amount of from about 1% by weight of blend (BWOB) to about 200% BWOB, based on a total weight of the cement blend.

Embodiment O1: The method of any one of Embodiments K1 through N1, wherein the wellbore servicing fluid has (B1) a density of from about 9 pounds per gallon (ppg) to about 26 ppg; (B2) a specific gravity of from about 1.1 to about 2.5; (B3) a mixability rating of from about 3 to about 5; (B4) a fluid loss of from about 10 ml per 30 minutes to about 250 nil per 30 minutes on 325 mesh screen at about 129° F. and about 1,000 psig differential pressure, when measured in accordance with a test standard API-RP-10B-2; (B5) a 10-second static gel strength of from about 1 to about 50, and a 10-minute static gel strength of from about 1 to about 300, at about 129° F. when measured in accordance with a test standard API-RP-10B-2; (B6) a thickening time of from about 3 hours to about 24 hours at about 129° F. and about 5000 psi when measured in accordance with a test standard API-RP-10B-2; (B7) a 50 psi UCA compressive strength of from about 1 hour to about 48 hours, a 500 psi UCA compressive strength of from about 2 hours to about 72 hours, and a 24 hr UCA compressive strength of from about 50 psig to about 10,000 psig, when measured at about 168° F. and about 5,000 psig in accordance with a test standard API-RP-10B-2; or (B8) any combination of (B1)-(B7).

Embodiment P1: The method of any one of Embodiments K1 through O1, wherein a cement cured from the wellbore servicing fluid has (C1) a crush compressive strength of from about 500 psig to about 12,000 psig; (C2) a Young's Modulus of from about 0.3 Mpsig to about 3 Mpsig; (C3) a Brazilian Tensile Strength of from about 50 psig to about 1,600 psig; or (C4) any combination of (C1)-(C3).

Embodiment Q1: The method of any one of Embodiments A1 through J1, wherein the wellbore servicing fluid is a spacer fluid; and wherein the spacer fluid has a density in a range of from about 4 pounds per gallon (ppg) to about 25 ppg.

Embodiment R1: A method comprising (a) forming a suspension composition comprising a crosslinked guar, monoethylene glycol (MEG), and a suspension viscosifier; (b) contacting the suspension composition with water to form a mixture at a location proximate a wellsite; (c) contacting the mixture with a cement blend and optionally one or more additives, weighting agents or weight-reducing agents to form a wellbore servicing fluid; (d) placing the wellbore servicing fluid in a wellbore penetrating a subterranean formation; and (e) allowing the wellbore servicing fluid to set.

Embodiment S1: The method of Embodiment R1, wherein the method further comprises adding a gas to the wellbore servicing fluid, prior to placing the wellbore servicing fluid in a wellbore penetrating a subterranean formation; wherein a target density of the wellbore servicing fluid is from about 5 pounds per gallon (ppg) to about 16 ppg.

Embodiment T1: The method of Embodiment SL, wherein the gas is present in the wellbore servicing fluid placed in the wellbore in an amount of from about 10 vol. % to about 30 vol. %, based on a total volume of the wellbore servicing fluid placed in the wellbore.

Embodiment U1: A method comprising (a) contacting a crosslinked guar, monoethylene glycol (MEG), and a suspension viscosifier to form a suspension composition; (b) conveying the suspension composition via a suspension flow line into water in a water flow line at a location proximate an offshore platform to form a diluted suspension; (c) conveying one or more additives via one or more additive flow lines into the diluted suspension in a diluted suspension line to form a mixture; (d) placing the mixture in a container; (e) adding a cement blend and optionally a weighting agent or a weight-reducing agent into the container to form a slurry; (f) blending the slurry to form a wellbore servicing fluid; (g) placing the wellbore servicing fluid in an offshore wellbore penetrating a subterranean formation; and (h) optionally allowing the wellbore servicing fluid to set.

Embodiment V1: A suspension composition comprising a particulate material, an organic carrier fluid, and a suspension viscosifier; wherein the particulate material is substantially insoluble in the organic carrier fluid: wherein the particulate material comprises a water-interactive material and/or a water-insoluble material; and wherein the organic carrier fluid comprises a glycol and/or a glycol ether.

Embodiment W1: The suspension composition of Embodiment V1, wherein the particulate material comprises a crosslinked guar; and wherein the organic carrier fluid comprises monoethylene glycol (MEG).

Embodiment X1: The suspension composition of any one of Embodiments V1 and W1 further comprising water, a biocide, or both water and a biocide.

Embodiment Y1: The suspension composition of Embodiment X1, wherein the biocide comprises 3,3'-methylenebis[5-methyloxazolidine].

Embodiment Z1: A wellbore servicing composition comprising the suspension composition of Embodiment V1, water, a cement blend, and optionally one or more additives, weighting agents or weight-reducing agents.

Embodiment Z2: A wellbore servicing composition comprising the suspension composition of Embodiment V1, water, and optionally one or more additives.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit. $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method comprising:
    contacting a liquid suspension composition, water, and a cement blend to form a wellbore servicing fluid at a location proximate a wellsite, wherein the liquid suspension composition comprises a crosslinked guar, monoethylene glycol (MEG), and a viscosifier;
    placing the wellbore servicing fluid in a wellbore penetrating a subterranean formation; and
    allowing the wellbore servicing fluid to set.

2. The method of claim 1, wherein the wellsite comprises an offshore platform, an offshore vessel, or combinations thereof, and wherein the wellbore is subsea.

3. The method of claim 2, further comprising transporting the liquid suspension composition to the offshore vessel or the offshore platform prior to forming the wellbore servicing fluid.

4. The method of claim 3, wherein the contacting to form the wellbore servicing fluid comprises:
    contacting the liquid suspension composition with water to form a mixture; and
    contacting the mixture with the cement blend to form the wellbore servicing fluid.

5. The method of claim 4, wherein contacting the liquid suspension composition, water, and the cement blend comprises a continuous process.

6. The method of claim 5, wherein contacting the liquid suspension composition with water comprises conveying the liquid suspension composition via a suspension flow line into the water in a water flow line to form the mixture in a mixture flow line.

7. The method of claim 6, further comprising adding one or more additives to the wellbore servicing fluid prior to placing the wellbore servicing fluid in the wellbore.

8. The method of claim 7, wherein the one or more additives are added to the mixture prior to contacting the mixture with the cement blend.

9. The method of claim 8, wherein adding one or more additives to the mixture comprises conveying the one or more additives via one or more additive flow lines into the mixture in the mixture flow line.

10. The method of claim 1, further comprising adding a weighting agent or a weight-reducing agent to the wellbore servicing fluid prior to placing the wellbore servicing fluid in the wellbore.

11. The method of claim 1, wherein the crosslinked guar is present in the liquid suspension composition in an amount of from about 1 wt. % to about 50 wt. % based on a total weight of the liquid suspension composition.

12. The method of claim 1, wherein the MEG is present in the liquid suspension composition in an amount of from about 49 wt. % to about 99 wt. % based on a total weight of the liquid suspension composition.

13. The method of claim 1, wherein the viscosifier comprises Guar gum, xanthan gum, welan gum, diutan, hydroxyethyl cellulose (HEC), modified cellulose and derivatives thereof, diatomaceous earth, starch, modified and/or crosslinked starch, modified cellulose, viscoelastic surfactants (VES), or combinations thereof.

14. The method of claim 1, wherein the viscosifier is present in the liquid suspension composition in an amount of from about 0.01 wt. % to about 20 wt. % based on a total weight of the liquid suspension composition.

15. The method of claim 1, wherein the liquid suspension composition further comprises water in an amount of from greater than 0 wt. % to about 30 wt. % based on a total weight of the liquid suspension composition.

16. The method of claim 1, wherein the suspension composition further comprises a biocide.

17. The method of claim 16, wherein the biocide comprises 3,3'-Methylenebis[5-methyloxazolidine].

18. The method of claim 16, wherein the biocide is present in the liquid suspension composition in an amount of from greater than 0 wt. % to about 1 wt. % based on a total weight of the liquid suspension composition.

19. The method of claim 1, wherein the liquid suspension composition is present in the wellbore servicing fluid in an amount of from about 0.1 wt. % to about 20 wt. % based on a total weight of the wellbore servicing fluid.

20. The method of claim 1, wherein the liquid suspension composition has:
   (i) a density of from about 9 pounds per gallon (ppg) to about 12 ppg;
   (ii) a specific gravity of from about 1.1 to about 1.4;
   (iii) a pH in a range of from about 4 to about 12;
   (iv) a Brookfield viscosity of from about 50 cP to about 600 cP at 75° F. and 100 rpm;
   (v) a flash point of equal to or greater than about 230° F.;
   (vi) a freezing point of from about 8° F. to about 24° F.;
   (vii) a boiling point of from about 210° F. to about 410° F.; or
   (viii) any combination thereof.

* * * * *